(12) United States Patent
Fu et al.

(10) Patent No.: US 10,395,376 B2
(45) Date of Patent: Aug. 27, 2019

(54) CMOS IMAGE SENSOR ON-DIE MOTION DETECTION USING INTER-PIXEL MESH RELATIONSHIP

(71) Applicant: QUALCOMM Incorporated, San Diego, CA (US)

(72) Inventors: Zhengming Fu, Austin, TX (US); Jia Yao, Cedar Park, TX (US); Daroosh Tayebi, Murrieta, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/654,503

(22) Filed: Jul. 19, 2017

(65) Prior Publication Data

US 2019/0026901 A1 Jan. 24, 2019

(51) Int. Cl.
*G06K 9/00* (2006.01)
*G06K 9/32* (2006.01)
(Continued)

(52) U.S. Cl.
CPC ............ *G06T 7/20* (2013.01); *G06K 9/00201* (2013.01); *G06K 9/3233* (2013.01); *G06K 9/46* (2013.01);
(Continued)

(58) Field of Classification Search
CPC .... H04N 3/155; H04N 5/144; H04N 5/23254; H04N 5/335; H04N 5/353; H04N 5/3696; H04N 5/3745; H04N 5/378; H04N 9/045
See application file for complete search history.

(56) References Cited

U.S. PATENT DOCUMENTS

2006/0013485 A1* 1/2006 Nitta ...................... H04N 5/367
382/194
2009/0066782 A1 3/2009 Choi et al.
(Continued)

FOREIGN PATENT DOCUMENTS

IE 102008052930 A1 4/2010

OTHER PUBLICATIONS

Liu X., et al., "A Low Power Multi-mode CMOS Image Sensor with Integrated On-chip Motion Detection", IEEE International Symposium on Circuits and Systems (ISCAS), 2013, pp. 2416-2419.
(Continued)

*Primary Examiner* — Amy R Hsu
(74) *Attorney, Agent, or Firm* — Kilpatrick Townsend & Stockton

(57) ABSTRACT

Techniques for motion detection are presented. An image sensor for motion detection includes a plurality of analog comparators and a two-dimensional pixel array including a plurality of rows of pixels and a plurality of columns of pixels. Each pixel is configured to convert an optical signal on the pixel into an analog signal. The two-dimensional pixel array is organized into a plurality of groups of pixels each associated with a combined group signal determined based on the analog signals from pixels in the group of pixels. Each analog comparator includes two inputs and is used to compare combined group signals generated by two groups of pixels of the plurality of groups of pixels during a same time period to generate a 1-bit inter-pixel digital signal, where each of the two groups of pixels is coupled to a corresponding input of the two inputs of the each analog comparator.

30 Claims, 12 Drawing Sheets

(51) Int. Cl.
| | |
|---|---|
| *G06K 9/46* | (2006.01) |
| *G06K 9/62* | (2006.01) |
| *G06T 7/20* | (2017.01) |
| *G06T 7/70* | (2017.01) |
| *H04N 5/341* | (2011.01) |
| *H04N 5/374* | (2011.01) |
| *H04N 5/378* | (2011.01) |

(52) U.S. Cl.
CPC .............. *G06K 9/6202* (2013.01); *G06T 7/70* (2017.01); *H04N 5/341* (2013.01); *H04N 5/374* (2013.01); *H04N 5/378* (2013.01)

(56) References Cited

U.S. PATENT DOCUMENTS

| | | | | |
|---|---|---|---|---|
| 2009/0140981 | A1* | 6/2009 | Kwak | ................ H04N 5/37455 345/158 |
| 2009/0289171 | A1* | 11/2009 | Jung | ..................... G06F 3/0304 250/208.1 |
| 2010/0172545 | A1 | 7/2010 | Lim et al. | |
| 2014/0226046 | A1* | 8/2014 | Lahav | .................... H04N 5/353 348/296 |
| 2014/0263961 | A1* | 9/2014 | Wang | ..................... H04N 5/144 250/208.1 |
| 2015/0319341 | A1 | 11/2015 | Sekine | |
| 2016/0286151 | A1* | 9/2016 | Lahav | ................ H04N 5/37452 |
| 2017/0064211 | A1 | 3/2017 | Omid-Zohoor | |
| 2017/0323912 | A1* | 11/2017 | Lahav | ............... H01L 27/14609 |
| 2017/0324910 | A1* | 11/2017 | Yang | ...................... H04N 5/357 |

OTHER PUBLICATIONS

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.

Zhao B., et al., "A 64 × 64 CMOS Image Sensor with On-chip Moving Object Detection and Localization", IEEE Transactions on Circuits and Systems for Video Technology, vol. 22, No. 4, 2011, pp. 1-10.

Kim D., et al., "A 1-mW CMOS Temporal-Difference AER Sensor for Wireless Sensor Networks", IEEE Transactions on Electron Devices, vol. 56, No. 11, Nov. 2009, pp. 2586-2593.

Aizawa K., et al., "On Sensor Image Compression," IEEE Transactions on Circuits and Systems for Video Technology, Institute of Electrical and Electronics Engineers, US, vol. 7 (3), Jun. 1, 1997, XP011014386, pp. 543-548.

International Search Report and Written Opinion—PCT/US2018/037610—ISA/EPO—dated Aug. 31, 2018.

* cited by examiner

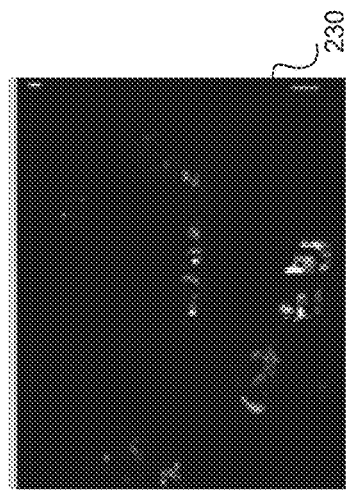
FIG. 2A
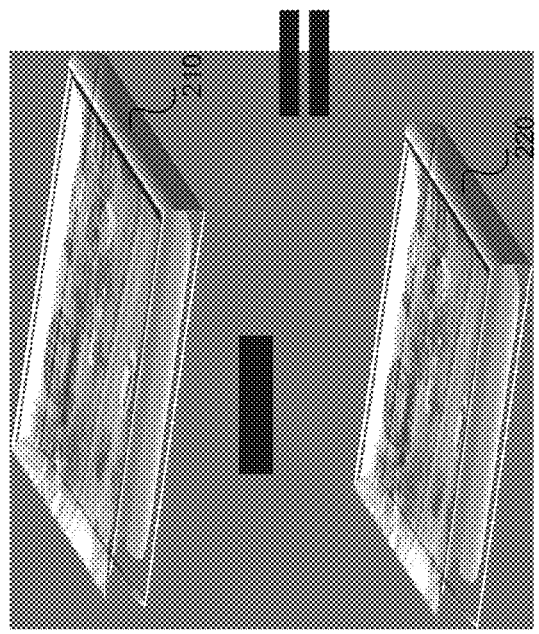
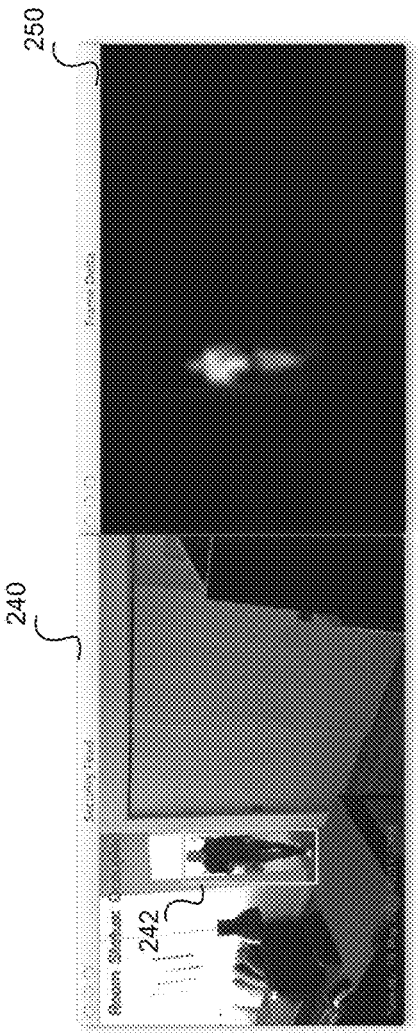
FIG. 2B

CMOS IMAGE SENSOR ON-DIE MOTION DETECTION USING INTER-PIXEL MESH RELATIONSHIP

BACKGROUND

Computer vision involves acquiring, processing, analyzing, and understanding images for use in various applications. Traditionally, an image processor (e.g., an image sensor processor) coupled to an image sensor may acquire image data from the image sensor and perform certain computer vision operations on the acquired image data to detect features in the image data and/or changes among different frames in the image data. The detected features and/or changes may be used in a variety of applications, such as object classification, face recognition, motion detection, object/feature tracking, gesture detection, etc.

Much effort has been made in recent years to enable computing devices to detect motions in the field of view of a computing device, such as a mobile device. Capturing images in the field of view of the computing device using traditional image sensors and processing the captured images to detect motions using conventional processors require significant processing resources, resulting in high power consumption and short battery life per charge cycle in computing devices, which may be very sensitive to power consumption.

BRIEF SUMMARY

This disclosure generally relates to image sensors for motion detection and/or tracking. More specifically, techniques disclosed herein relate to a complementary metal-oxide-semiconductor (CMOS) image sensor that can generate inter-pixel mesh relationship information for motion detection, where changes in inter-pixel mesh relationship may indicate motions of objects in the field of view of the CMOS image sensor and the relevant location of the object in motion. Thus in at least one embodiment, no analog-to-digital conversion (ADC) circuit is required to convert analog sensor signals to digital data for motion detection. In at least one embodiment, no analog memory is used to store analog sensor signals in the pixel level. The memory space for storing the inter-pixel mesh relationship information can be relatively small. The power consumption of the image sensor using the techniques disclosed herein can be much lower than the power consumption exhibited in conventional techniques, such as an image sensor with a pixel array and an ADC interface, in conjunction with software-based or hardware-based (e.g., digital signal processing (DSP) hardware-based) motion detection technique.

In some embodiments, an image sensor is disclosed. The image sensor may include a plurality of analog comparators and a two-dimensional pixel array characterized by a plurality of rows of pixels and a plurality of columns of pixels. Each pixel may be configured to convert an optical signal on the pixel into an analog signal. The two-dimensional pixel array may be organized into a plurality of groups of pixels, where each group of pixels may be associated with a combined group signal determined based on the analog signals from pixels in the group of pixels. Each analog comparator may include two inputs and may be used to compare combined group signals generated by two groups of pixels of the plurality of groups of pixels during a same time period to generate a 1-bit inter-pixel digital signal, where each of the two groups of pixels may be coupled to a corresponding input of the two inputs of the each analog comparator. In some embodiments, each analog comparator of the plurality of analog comparators may be configured to generate a "1" when a combined group signal connected to a positive input of the analog comparator is greater than a combined group signal connected to a negative input of the analog comparator, and generate a "0" otherwise.

In some embodiments of the image sensor, the combined group signal generated by a group of pixels may include a sum or an average of the analog signals generated by pixels in the group of pixels. In some embodiments, each group of the two groups of pixels may consist of one pixel, and the two pixels for the two groups of pixels are adjacent pixels in a row of pixels of the two-dimensional pixel array.

In some embodiments, the image sensor may include a decoder circuit configured to selectively couple outputs of a number of groups of pixels to the plurality of analog comparators at a time. In some embodiments, the image sensor may include a row decoder circuit configured to selectively couple outputs of one row of pixels from the plurality of rows of pixels to the plurality of analog comparators at a time. In some embodiments, the image sensor may further include a circuit configured to store inter-pixel digital signals for groups of pixels in each row of pixels, where the inter-pixel digital signals may correspond to a row in a comparison image frame, and the comparison image frame may include a plurality of rows each corresponding to a row of pixels of the two-dimensional pixel array.

In some embodiments, the image sensor may also include a circuit configured to process the inter-pixel digital signals generated by the plurality of analog comparators for the plurality of groups of pixels, and store the processed inter-pixel digital signals in a memory device. In some embodiments, processing the inter-pixel digital signals may include encoding the inter-pixel digital signals generated by the plurality of analog comparators for the plurality of groups of pixels.

In some embodiments, each pixel in the two-dimensional pixel array may include a comparator configured to generate an event signal when the analog signal is higher than a reference signal level. In some embodiments, the image sensor may also include an address encoder configured to encode an address of a pixel that generates the event signal, and a processing unit configured to generate an image frame based on the address of the pixel that generates the event signal. In some embodiments, the image sensor may further include a global reference generator configured to generate a plurality of reference signal levels for the two-dimensional pixel array.

In some embodiments, a method for motion detection is disclosed. The method may include converting, by each pixel of a plurality of pixels of a two-dimensional pixel array on an image sensor, an optical signal on the pixel into an analog signal, where the two-dimensional pixel array may be organized into a plurality of groups of pixels, and each group of pixels may be associated with a combined group signal determined based on the analog signals from the pixels in the group of pixels. The method may also include comparing, by each analog comparator of a plurality of analog comparators, combined group signals from a pair of adjacent groups of pixels in the plurality of groups of pixels to generate a 1-bit inter-pixel digital signal, and generating a comparison image frame including inter-pixel digital signals for the plurality of groups of pixels. In some embodiments, each analog comparator of the plurality of analog comparators may be configured to generate a "1" when a combined group signal connected to a positive input of the analog comparator is greater than a combined group signal connected to a negative input of the analog comparator, and generate a "0" otherwise.

In some embodiments, the method may also include comparing the comparison image frame with a previous comparison image frame including inter-pixel digital signals for the plurality of groups of pixels generated during a previous time period to detect a motion of an object. In some embodiments, the method may further include configuring the image sensor to capture images using the two-dimensional pixel array in response to a detected motion of the object. In some embodiments, capturing images using the two-dimensional pixel array may include generating an event signal when the analog signal from a pixel of the plurality of pixels is higher than a reference signal level, encoding an address of the pixel that causes the generation of the event signal, and generating an image frame based on the address of the pixel that generates the event signal.

In some embodiments, each group of the pair of adjacent groups of pixels may consist of one pixel, and the two pixels for the pair of adjacent groups of pixels may be adjacent pixels in a row of pixels of the two-dimensional pixel array. In some embodiments, the method may also include selectively coupling outputs of one row of pixels from the two-dimensional pixel array to the plurality of analog comparators at a time. In some embodiments, the method may further include storing inter-pixel digital signals for groups of pixels in each row of pixels, where the inter-pixel digital signals may include a row in the comparison image frame, and the comparison image frame may include a plurality of rows each corresponding to a row of pixels of the two-dimensional pixel array.

In some embodiments, the method may include processing the inter-pixel digital signals generated by the plurality of analog comparators for the plurality of groups of pixels, and storing the processed inter-pixel digital signals in a memory device. In some embodiments, processing the inter-pixel digital signals may include encoding or compressing the inter-pixel digital signals generated by the plurality of analog comparators for the plurality of groups of pixels.

Also disclosed herein is an apparatus for motion detection. The apparatus may include a plurality of means for converting an optical signal into an analog signal, where the plurality of means for converting the optical signal into the analog signal may be organized into a plurality of groups, where each group may be associated with a combined group signal determined based on the analog signals from the means for converting the optical signal into the analog signal in the group. The apparatus may also include means for comparing combined group signals from adjacent groups of the plurality of groups to generate 1-bit inter-pixel digital signals for the plurality of groups, and means for generating a comparison image frame including the 1-bit inter-pixel digital signals for the plurality of groups.

In some embodiments, the apparatus may also include means for comparing the comparison image frame with a previous comparison image frame including inter-pixel digital signals for the plurality of groups generated during a previous time period to detect a motion of an object. In some embodiments, the apparatus may also include means for processing the inter-pixel digital signals, and means for storing the processed inter-pixel digital signals. In some embodiments, the means for processing the inter-pixel digital signals may include means for encoding the inter-pixel digital signals.

Also disclosed herein is an article comprising a non-transitory storage medium. The non-transitory storage medium may include machine-readable instructions stored thereon that are executable by a special purpose computing device to receive 1-bit inter-pixel digital signals for a plurality of groups of pixels of a two-dimensional pixel array, and generate a comparison image frame including the inter-pixel digital signals for the plurality of groups of pixels. The 1-bit inter-pixel digital signals may be generated as output by each analog comparator of a plurality of analog comparators taking combined group signals from a pair of adjacent groups of pixels in the plurality of groups of pixels of the two-dimensional pixel array as input.

In some embodiments, the instructions may be executable by the special purpose computing device to compare the comparison image frame with a previous comparison image frame including inter-pixel digital signals for the plurality of groups of pixels generated during a previous time period to detect a motion of an object. In some embodiments, the instructions may be executable by the special purpose computing device to receive inter-pixel digital signals for groups of pixels in each row of pixels of the two-dimensional pixel array, and store the inter-pixel digital signals for the groups of pixels in each row of pixels as a row in the comparison image frame, where the comparison image frame may include a plurality of rows each corresponding to a row of pixels of the two-dimensional pixel array. In some embodiments, the instructions may be executable by the special purpose computing device to process the inter-pixel digital signals generated by the plurality of analog comparators for the plurality of groups of pixels before storing the processed inter-pixel digital signals in a memory device.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings.

FIG. 2A illustrates an example method of motion detection based on temporal differences between two image frames.

FIG. 2B illustrates example results of motion detection by subtracting two image frames.

DETAILED DESCRIPTION

Figure 1:
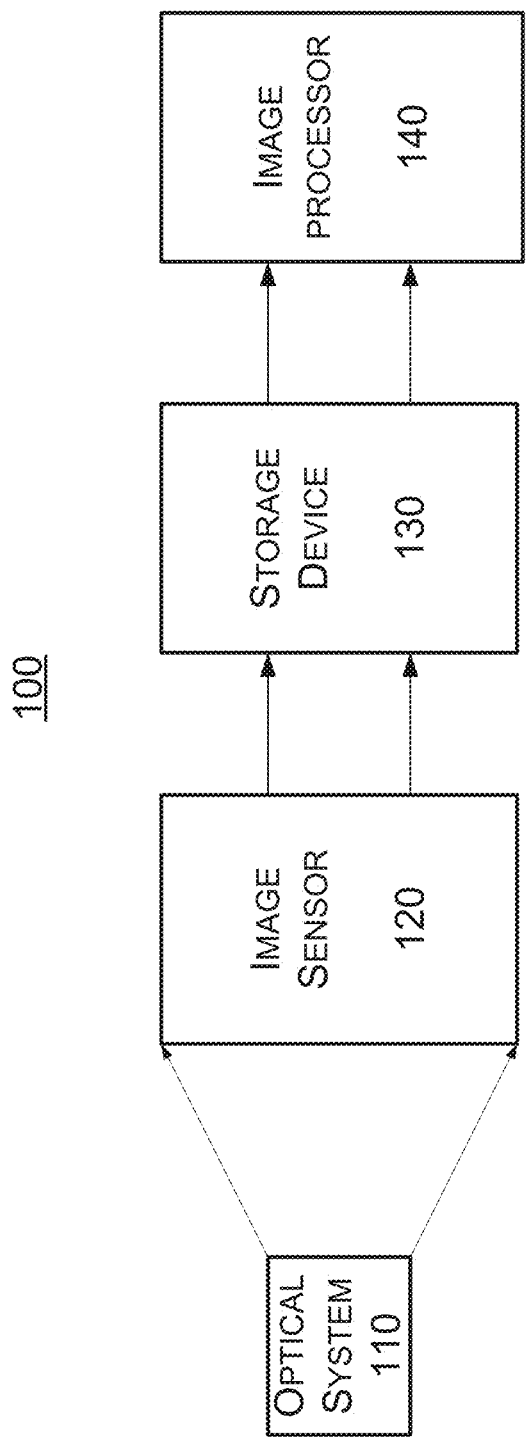
FIG. 1 illustrates a simplified block diagram of an example computer vision-based motion detection system.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The present disclosure generally relates to motion sensing, detection, and/or tracking using image sensors. Motion sensing, detection, and/or tracking may be used in various devices for various applications, such as, for example, security and autonomous driving. For remote motion sensing, an image sensor may be used to capture image frames for a remote scene, and detect motions based on the temporal differences between different image frames. In, for example, various power sensitive or bandwidth sensitive devices and applications, motion sensing and detection may be used to trigger other applications on the devices upon the detection of motions. For example, in a power-sensitive device, a low-power always-on camera or motion sensor may be used to detect motions in the field of view of the camera, and most portions of the power-sensitive device may be powered off or in a sleep mode until a motion is detected. To further reduce power consumption, it is desirable that the always-on camera or motion sensor consumes a minimum amount of power as well.

One technique to obtain motion information using image sensors is a digital frame subtraction technique, where digitized image frames captured at different time instants are saved and compared to find the differences between two image frames. To capture one pixel in each image frame, an analog-to-digital conversion may be performed. The power consumed by analog-to-digital conversion and digital data processing (e.g., subtraction), in particular, a non-vector optimized processor (e.g., a general-purpose processor), may be high, and a large and fast memory may be needed to store the digitized image frames from a large image sensor with a fast frame rate.

Another technique for motion sensing and detection uses an analog memory-based temporal-difference sensor to compute the temporal differences between two frames. Each pixel of the temporal-difference sensor may include an analog memory (e.g., a capacitor) to store a signal representing pixel gray-level/color information for the previous frame. The signal of the current frame may be compared with the stored signal for the previous frame to determine the changes over time. Due to the number of transistors and the analog memory (e.g., the capacitor) used in each pixel sensor, the pixel size of the temporal-difference is usually large, and the pixel fill factor and pixel counts on a sensor die are usually low. Therefore, the resolution and sensitivity of the temporal-difference sensor may be much lower than a complementary metal-oxide-semiconductor (CMOS) image sensor, such as a three-transistor (3T) or four-transistor (4T) active pixel sensor.

Techniques disclosed herein relate to CMOS image sensors that can capture inter-pixel mesh relationship information for motion detection. More specifically, in one embodiment, rather than digitizing analog signals of the pixels and storing the digitized signals in image frames for digital subtraction, the CMOS image sensor may generate image frames that include a 1-bit inter-pixel value for each pair of adjacent pixels or groups of pixels. The inter-pixel value indicates a relationship between the values of the analog signals of two adjacent (groups of) pixels. The image frames that include the inter-pixel mesh relationship information may then be used to detect motions based on differences between two image frames. Thus, compared with the digital frame subtraction technique, no analog-to-digital conversion, large storage space, or complex digital processing is needed for motion detection using techniques disclosed herein. Compared with the analog memory-based temporal-difference sensor, the CMOS image sensor disclosed herein uses fewer transistors and no analog memory (comparable to a digital CMOS image sensor), and thus the pixel size can be small and the pixel fill factor can be high. Therefore, the CMOS image sensor for motion detection disclosed herein can have the same spatial and gray-level/color resolutions as any other CMOS image sensor for capturing image frames at a higher gray-level/color resolution, for example, when a motion is detected.

I. Motion Detection Using Image Sensor

Motion detection may be performed remotely using an image sensor based on, for example, a digital frame subtraction technique. In an example digital frame subtraction-based motion detection technique, a CMOS image sensor may be used for sensing/digitizing images, the digitized images may be stored in a memory, and a separate image processor may be used for processing the digitized image.

FIG. 1 illustrates a simplified block diagram of an example computer vision-based motion detection system 100. As illustrated, system 100 may include an optical system 110, an image sensor 120, a storage device 130, and an image processor 140. System 100 may be a stand-alone device (e.g., a security camera) or may be a part of a mobile device (e.g., a cellular phone or a tablet). As shown in FIG. 1, optical system 110 may project an image on image sensor 120, which may generate digital image data of the image. The digital image data may then be stored in storage device 130, such as a static random-access memory (SRAM) device, for later processing. Image processor 140 may compare the stored digital image data captured at different time instants to detect a motion of an object in the field of view of system 100.

Optical system 110, image sensor 120, storage device 130, and image processor 140 may be implemented in various configurations at various granularities. For example, image sensor 120 may represent a single sensor element or the entire sensor array. Image sensor 120 may be implemented in a single chip or multiple chips, such as an integrated circuit (IC) including primarily analog circuits and an IC including primarily digital circuits. Storage device 130 may be a stand-alone memory device, or may be integrated with an IC including image sensor 120 or image processor 140. Image processor 140 may be implemented as on-chip sensor circuitry, dedicated peripheral circuitry, firmware/software instructions executable on a general-purpose or special-purpose processor, or any combination thereof. Generally, image sensor 120 (e.g., a CMOS image sensor) and image processor 140 (e.g., an image sensor processor) are on different dies due to different manufacturing processes.

In some implementations, image sensor 120 may be a CMOS image sensor including millions of pixels, and may have a frame rate of, for example, 30 frames per second (fps) or 60 fps. Each pixel in image sensor 120 may generate a voltage or current signal associated with the intensity of the light illuminating the pixel. For example, the pixel may convert the optical signal on the pixel to an electrical current or integrate the current (e.g., photodiode current) using a capacitive tank to generate a voltage signal. To capture one pixel in each image frame, an analog-to-digital conversion may be performed, and a digital value of, for example, 7 to 10-bit, may generally be used to represent the pixel in the image frame. If each pixel is represented by an 8-bit (1-byte) data, the output data rate from image sensor 120 may be 30 megabytes per second (MBPS) or higher. Storage device 130 may be large and fast in order to store the output digital image data from image sensor 120. Image processor 140 may need to read and process data from storage device 130 at a high data rate for real-time motion detection. Thus, a high level of power may be consumed by image sensor 120 (including analog-to-digital conversion), storage device 130, and/or image processor 140.

FIG. 2A illustrates a method of motion detection based on a temporal difference between two digitized image frames. As shown in FIG. 2A, a first image frame 210 and a second image frame 220 may be captured at different time instants by an image sensor, such as image sensor 120 of FIG. 2. At least one of first image frame 210 and second image frame 220 may be stored in a storage device, such as a random-access memory (RAM) device or a flash memory. An image processor, such as image processor 140 of FIG. 1, may read first image frame 210 and/or second image frame 220 from the storage device, or receive first image frame 210 and/or second image frame 220 from the image sensor, and perform a subtraction of first image frame 210 from second image frame 220 (or vice versa) to generate a differential frame 230. If there is no or little difference between first image frame 210 and second image frame 220, differential frame 230 may be, for example, all dark (e.g., with a value of "0" for each pixel) or all white (e.g., with a values of "255" for each pixel). If there is a motion of any object during the time period the two image frames are captured, some pixels in differential frame 230 may have values between, for example, 0 and 255.

FIG. 2B illustrates example results of motion detection by subtracting two image frames to filter out static information. In FIG. 2B, compared with a previous image frame, image frame 240 includes a subject 242 that is entering the room through a door. A differential image frame 250 highlights such differences by showing the profile of the subject against a dark background. Based on differential image frame 250, a camera may zoom in to the specific location where the subject is detected to capture more details of the subject.

Remote motion detection may also be performed using an image sensor with on-die motion detection capability. For example, motion sensing and detection may be performed using an on-die temporal-difference sensor that includes analog memory to store a historic analog detection signal for computing the temporal difference between two frames.

Figure 3:
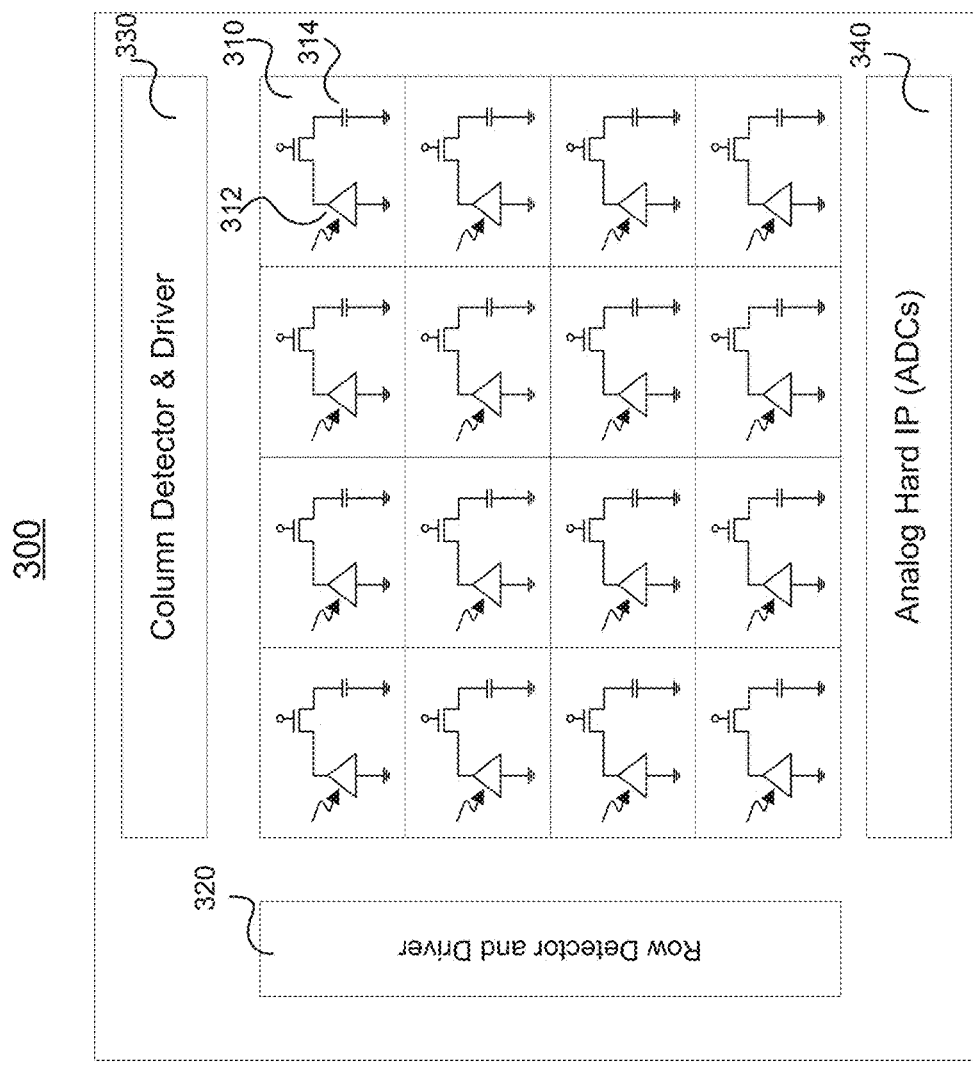
FIG. 3 illustrates an example temporal-difference sensor using analog memory.

FIG. 3 illustrates an example temporal-difference sensor 300 using analog memory. Temporal-difference sensor 300 may include a plurality of pixels (such as pixel 310) arranged in an array. Each pixel (such as pixel 310) in temporal-difference sensor 300 may include a light sensor 312, such as a photodetector or photodiode, that can generate an electrical voltage or current signal corresponding to the intensity of the optical signal illuminating the pixel. For example, each pixel may convert the optical signal on the pixel to an electrical current or integrate the current using a capacitive tank to generate a voltage signal. Each pixel in temporal-difference sensor 300 may include an analog memory (e.g., a capacitor 314) to store an analog signal, which may also be referred to as an analog detection signal, representing pixel gray-level/color information for the previous detection period (frame). The analog detection signal of the current frame may be compared with the stored analog detection signal for the previous frame. An event signal (e.g., a single bit of "1") may be generated when the difference is higher than a threshold. Because each pixel not only converts the optical signal to an electrical signal, but also stores the previous electrical signal and compares the previous electrical signal with the current electrical signal, pixel 310 may include more transistors and other circuits than a typical CMOS image sensor pixel.

Temporal-difference sensor 300 may include a row decoder and driver circuit 320 and a column decoder and driver circuit 330 at the boundary of the pixel array for selectively activating one or more pixels (e.g., a row of pixels similar to pixel 310) to read the analog detection signal. In some implementations, an array of analog-to-digital convertors (ADCs) 340 each corresponding to a column of pixels (e.g., similar to pixel 310) may be used to convert the analog detection signals from each row of pixels to digital image data.

One major drawback of temporal-difference sensor 300 is that, due to the number of transistors and/or other circuits and the analog memory (e.g., the capacitor used in a pixel, the pixel size of pixel 310 is usually large, such as about 10×10 to 20×20 $\mu m^2$, compared with about 2×2 $\mu m^2$ in a CMOS image sensor. In addition, the pixel fill factor of temporal-difference sensor 300 is usually low, such as less than about 20%, compared with about 50~60% in a CMOS image sensor. Therefore, the resolution, on-die pixel counts, and the sensitivity of temporal-difference sensor 300 may be much lower than a typical CMOS image sensor.

II. Address Event Representation Image Sensor

In some implementations, a CMOS image sensor may be an address event representation (AER) image sensor that may consume less power than a traditional CMOS image sensor.

Figure 4:
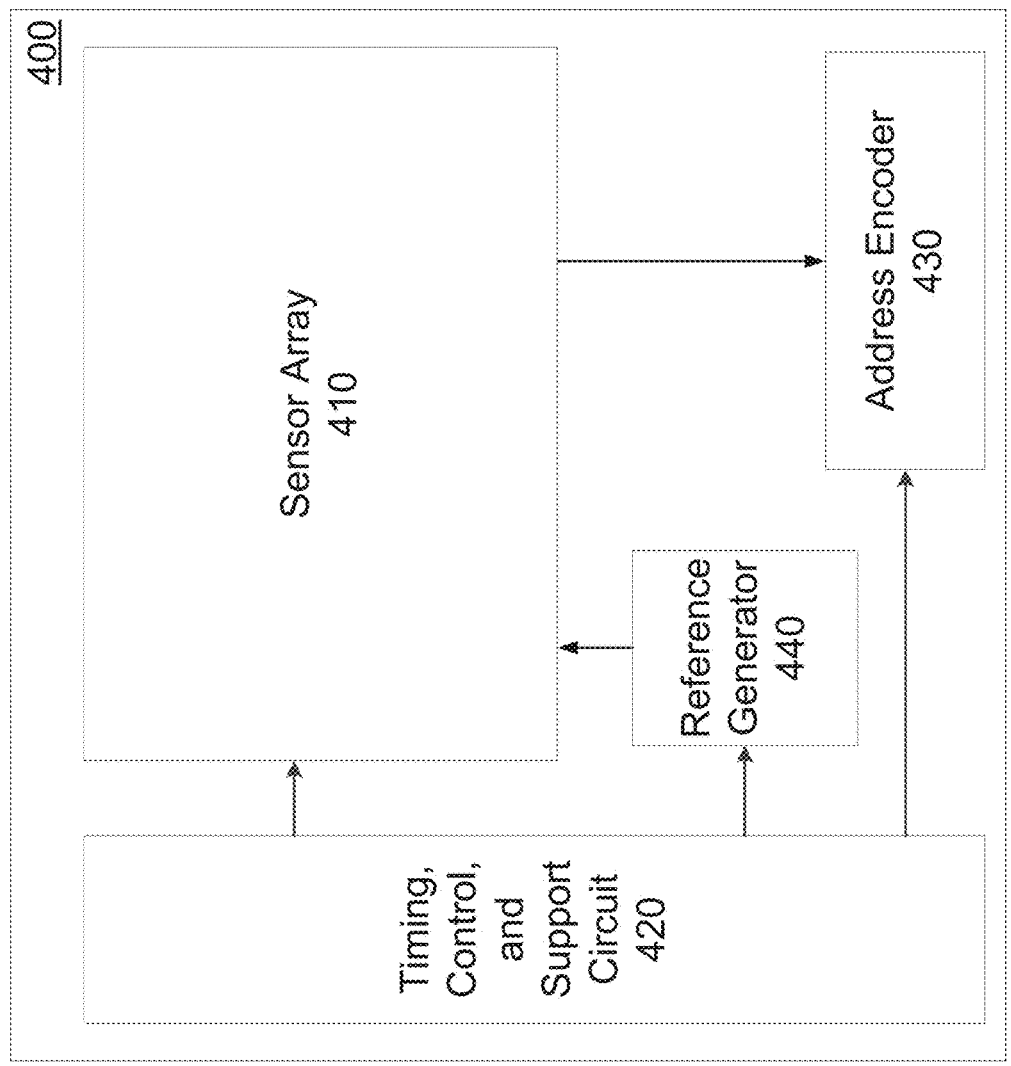
FIG. 4 is a simplified block diagram of an example address event representation (AER)-based image sensor.

FIG. 4 is a block diagram of an AER-based image sensor 400. AER-based image sensor 400 may include a sensor array 410, a timing, control, and support circuit 420, an address encoder 430, and a reference generator 440. Each sensor pixel in sensor array 410 may include a light sensor for converting an optical signal into a voltage or current signal. Each sensor pixel may include an integrator for integrating the converted voltage or current signal, and a comparator for comparing the integrated voltage or current signal with a reference level set by reference generator 440 that generates a variable global reference signal (hence reference generator 440 may be called, for example, a global reference generator) for a plurality of comparators within sensor array 410 (e.g., a two-dimensional pixel array). When the integrated signal is less than the global reference signal, no event is being generated at the sensor pixel. When the integrated signal is greater than the global reference signal, an event signal, such as a spike or a digital pulse, may be generated by the sensor pixel and sent to the address encoder 430. A time period of events for an address may represent the time between the event and a next event for a pixel at the address. Address encoder 430 can be configured to encode an address of a pixel that generates the event signal. Hence, in one example, the address encoder 430 may include a horizontal (column) address encoder and a vertical (row) address encoder for encoding the column (x) and row (y) coordinates of sensor pixels that generate events and sending the addresses of these sensor pixels on a bus to an image processor. Upon receiving the sequence of address data with embedded timing information, the image processor can decode the address data and duplicate the events or generate an image, for example, a gray-scale image or a binary image, without using ADCs.

One advantage of AER image sensors is that they do not need to be queried sequentially for information from each pixel. Rather, they push information to the receiver once they have gathered it or an event occurs. Thus, virtually no power is used by the pixel until an event is generated. Encoding the analog light intensity data as a stream of digital pulses also provides noise immunity because of the digital quantization and redundancy.

In some implementations, the intensity of the light illuminating each pixel may be represented by the frequency of events generated by each pixel. For example, the voltage signal for a pixel may be reset after an event is generated, and the current signal is integrated again after the reset. Thus, strong light makes a pixel generate events at a higher rate while weak light makes a pixel generate events at a proportionally lower rate. As a result, an AER system may represent light intensity on a pixel as a frequency-modulated sequence of addresses, where the time interval between identical addresses (same pixel) may be inversely proportional to the intensity of the light incident on the pixel. The frequency-modulated sequence of addresses with time interval between identical addresses inversely proportional to the optical signal intensity can be transmitted to a receiving unit, and the image can be reconstructed by the receiving unit as a gray-scale image based on a histogram representing the frequencies of all pixels in the image or a binary image, for example, for local binary pattern generation, without using ADCs.

In some embodiments, an image processor may create a binary image at each reference level for the sensor pixels of interest based on the addresses of the sensor pixels that generate the events. For example, if the event rate of a sensor pixel is equal to or greater than a threshold rate, a "1" may be assigned to an image pixel corresponding to the sensor pixel; otherwise, a "0" may be assigned to the image pixel. In some implementations, an event generated on a sensor pixel may indicate that the intensity of the light incident on the pixel is greater than a threshold level. In such implementations, based on the addresses of the sensor pixels that generate events, a binary image may be created or updated for the threshold level. For example, if an event is generated on a sensor pixel, a "1" may be assigned to an image pixel corresponding to the sensor pixel on the binary image; if no event is generated on a sensor pixel, a "0" may be assigned to the image pixel corresponding to the sensor pixel on the binary image.

In some embodiments, reference generator 440 may generate a reference signal of different levels at different times, and feed the reference signal to the comparators in all pixels of interest within a two-dimensional pixel array. The reference signal may be, for example, a rising or falling continuous ramping. For example, the reference signal may increase from a minimum level, such as 0 volt (V), to a maximum level, such as a supply voltage, monotonically or linearly. The reference signal may also decrease from a maximum level to a minimum level monotonically or linearly. The reference signal may be at a different level in each sampling period during which an image may be generated. The sampling period may be less than a frame rate of the images to be captured, such as a small fraction of the frame rate of the images to be captured.

When the reference level changes in a different sampling period, a new binary image may be generated or updated at the new reference level as described above. As the reference level changes and new binary images are generated, the image processor may reconstruct a gray-scale image based on the binary images. For example, if the reference level increases linearly, a binary image indicating pixels that generate electric signals at levels higher than each reference level may be generated for each reference level. Thus, if a pixel in the binary images changes from "1" to "0" (i.e., a transition point) when the reference level increases from a first level to a second level, the intensity of the light that illuminates the pixel may be determined based on the first level and the second level. In this way, when the reference level increases from a minimum level to a maximum level, the transition point for each pixel may be determined, and a gray-scale image may be generated based on these transition points.

Figure 5:
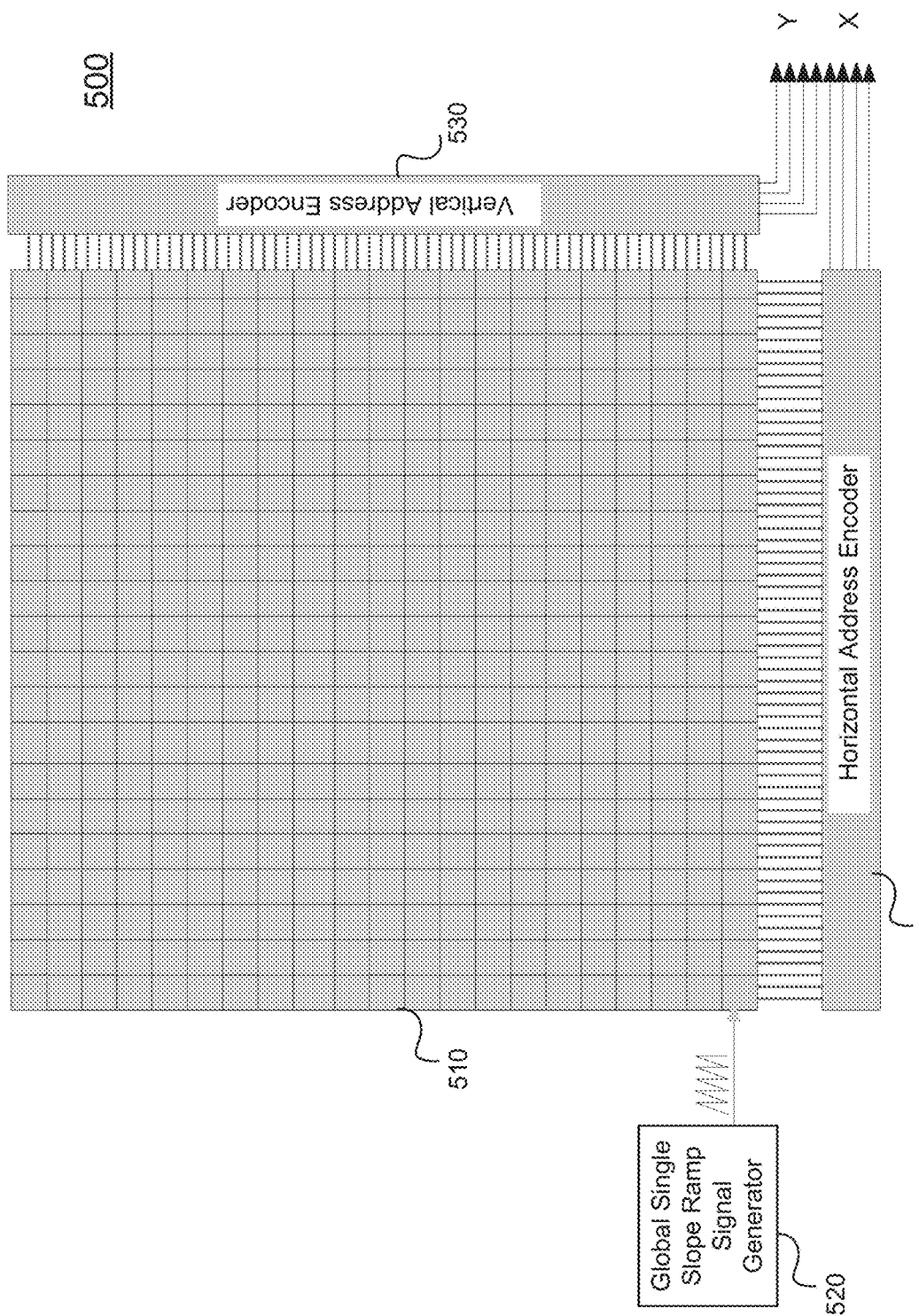
FIG. 5 illustrates an example AER-based image sensor using a single-slope ramp signal generator.

FIG. 5 illustrates an example AER-based image sensor 500 using a single-slope ramp signal generator. AER-based image sensor 500 may include a global single-slope ramp signal generator 520, a 2-dimensional pixel array 510, and a vertical address encoder 530 and a horizontal address encoder 540 coupled to 2-dimensional pixel array 510. AER-based image sensor 500 may also include a timing circuit (not shown) for clocking and controlling other functional blocks of AER-based image sensor 500.

Global single-slope ramp signal generator 520 may be an example of reference generator 440 described above with respect to FIG. 4. Global single-slope ramp signal generator 520 may be coupled to each pixel in 2-dimensional pixel array 510. Global single-slope ramp signal generator 520 may generate a controllable single-slope linear signal and feed the single-slope linear signal to the comparator of each pixel in 2-dimensional pixel array 510. The resolution or unit step of the ramp signal generator may be determined based on the desired resolution and accuracy. The single slope may be a rising slope or a falling slope. The slope of global single-slope ramp signal generator 520 may be determined based on, for example, sampling rate, frame rate, and mode of operation of AER-based image sensor 500. For example, global single-slope ramp signal generator 520 may generate one reference level or one slope in one sampling period, or generate one slope for one image frame.

As described above with respect to FIG. 4, 2-dimensional pixel array 510 may include sensor pixels that can convert optical signals into electrical signals, and generate events when the electrical signals are greater than a reference level generated by global single-slope ramp signal generator 520. Each sensor pixel may include a sensing element for sensing an optical signal, and a comparator for comparing the generated electrical signal with the reference level. Horizontal address encoder 540 and vertical address encoder 530 may be configured to determine the column (x) and row (y)

addresses of the pixels that generate events indicating that the electrical signals are greater than the reference level, and send the determined column and row addresses for processing, such as generating gray-scale images or binary images, by other hardware units or software modules. For example, with the single-slope ramp signal as the reference signal, a series of binary images may be generated as the reference level increases. The series of binary images may then be used to generate a gray-scale image as described above with respect to FIG. 4. As such, the global reference generator can be configured to generate a plurality of reference signal levels, and a binary image can be generated for each of the plurality of reference levels.

As can be seen from FIGS. 4 and 5, no ADC is needed in the AER-based image sensors. The power consumption for the comparators and address encoders, and thus the AER-based image sensors can be very low.

Even though the above embodiments are described in specific examples, their implementations are not limited to the specific examples described above. Rather, embodiments of a possible AER-based image sensor can be implemented with or without some functional blocks, by integrating several functional blocks into one unit or dividing one functional block into several functional blocks, or implementing some functional blocks in different chips or printed circuit boards (PCBs), or in software. For example, reference generator 440 or global single-slope ramp signal generator 520 may be separate from the image sensor, which may include a global reference signal input port for receiving a global reference signal from reference generator 440 or global single-slope ramp signal generator 520.

III. Inter-Pixel Mesh Relationship Sensor

Rather than digitizing analog detection signals of the pixels for every image frame and storing the digitized signals in image frames for digital image frame subtraction, a CMOS image sensor according to certain aspects of this disclosure may generate image frames that include inter-pixel mesh values indicating a relationship between the values of the light intensity signals on adjacent pixels or groups of pixels. When an object within the scene moves, the inter-pixel mesh values may change or move accordingly. Therefore, the changes or movement in the inter-pixel mesh values from one image frame to another image frame can indicate the movement of the object, and thus can be used for motion detection and tracking.

Figure 6:
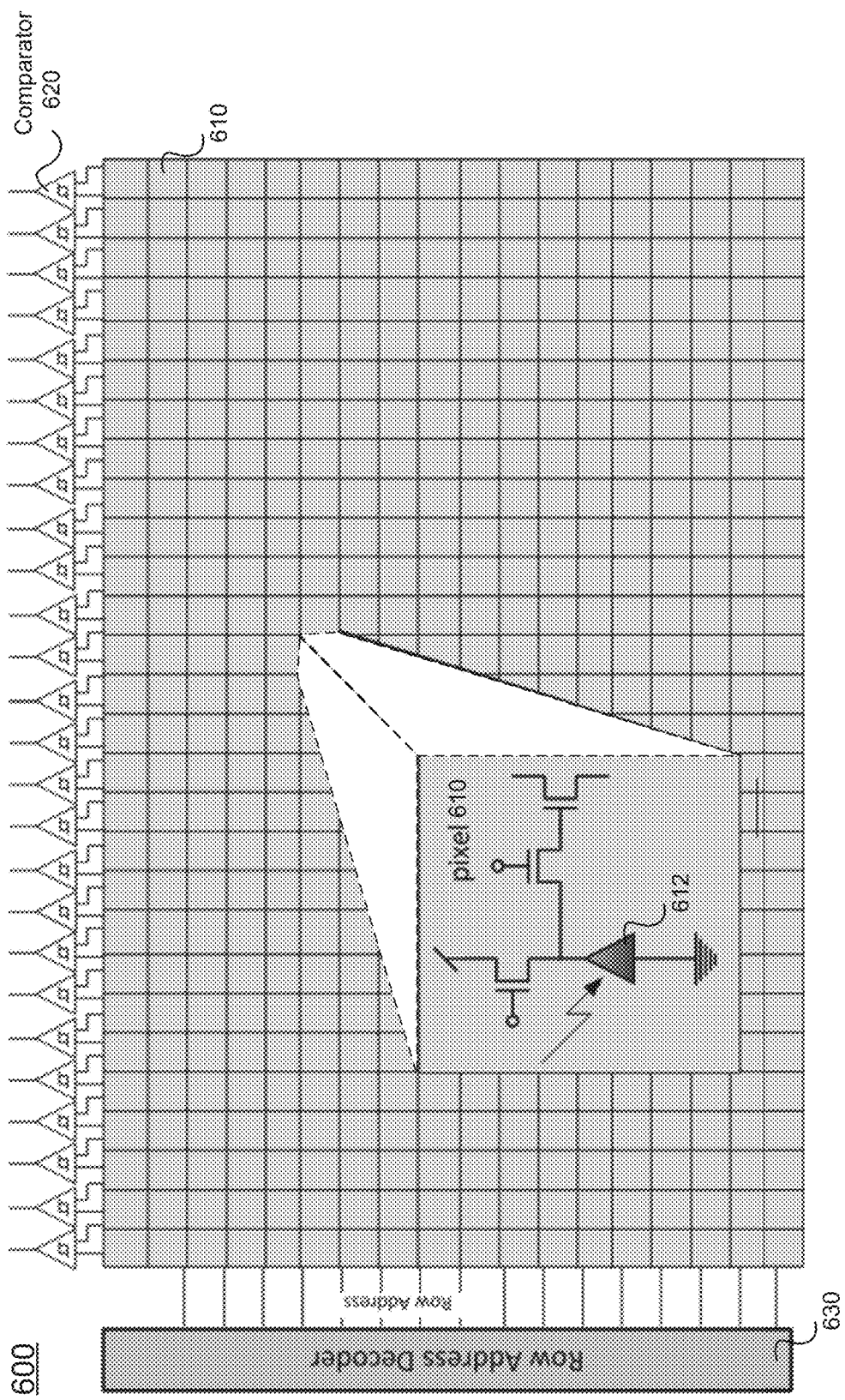
FIG. 6 illustrates an example inter-pixel mesh relationship sensor for motion detection, according to certain aspects of the present disclosure.

FIG. 6 illustrates an example inter-pixel mesh relationship sensor 600 for motion detection, according to certain aspects of the present disclosure. Inter-pixel mesh relationship sensor 600 may include a CMOS image sensor having a two-dimensional pixel array that includes a plurality of pixels (similar to pixel 610). Each pixel (such as pixel 610) may include a photodetector 612 and transistors for selectively activating the pixel and driving the analog detection signal from photodetector 612 in the pixel to the corresponding column line.

Each row of pixels (which can include pixels similar to pixel 610) may be selected using a row address decoder 630, which may also be referred to simply as a row decoder circuit. The row address decoder 630 can be configured to selectively couple output of a number of pixels in one row of pixels from the plurality of rows of pixels, or a number of groups of pixels in one row of groups of pixels from the plurality of rows of groups of pixels, to the plurality of analog comparators at a time. For example, analog detection signals from two adjacent pixels in the selected row that are connected to two adjacent column lines may be compared by a comparator 620 connected to the two adjacent column lines, and a single bit may be generated by comparator 620 based on the relationship between the detection signals from the two adjacent pixels. For example, a "1" may be generated when the detection signal connected to a positive input pin of comparator 620 is greater than the detection signal connected to a negative input pin of comparator 620. Hence, in a system including a plurality of analog comparators, each analog comparator can comprise two inputs (including, in one example, a positive input of the analog comparator and a negative input of the analog comparator) and can be configured to compare analog signals from two pixels, or to compare combined group signals generated by two groups of pixels, during a same time period to generate a 1-bit inter-pixel digital signal (for example, where each analog comparator can be configured to generate a "1" when a combined group signal connected to the positive input of the analog comparator is greater than a combined group signal connected to the negative input of the analog comparator, and generate a "0" otherwise), where each of the two pixels or groups of pixels are coupled to a corresponding input of the two inputs of each analog comparator. In this way, for a row with N pixels, N−1 1-bit values may be generated and saved to a memory. Each of the 1-bit values may be referred to as inter-pixel digital signal.

The rows in the two-dimensional pixel array may be selected sequentially, and the detection signals from the pixels in each row may be connected to and compared by the comparator array to generate N−1 1-bit values (i.e., inter-pixel digital signals) indicating the inter-pixel mesh relationship between adjacent pixels in the row. The N−1 inter-pixel digital signals generated for the N pixels (or N groups of pixels) in each row may be saved to a storage circuit as a row in a comparison image frame. One comparison image frame may be generated for the two-dimensional pixel array, where the comparison image frame may comprise a plurality of rows each corresponding to a row of pixels in inter-pixel mesh relationship sensor 600. The number of rows in the comparison image frame may be equal to the number of rows of pixels in inter-pixel mesh relationship sensor 600, and each row in the image frame may include N−1 1-bit values.

Figure 7:
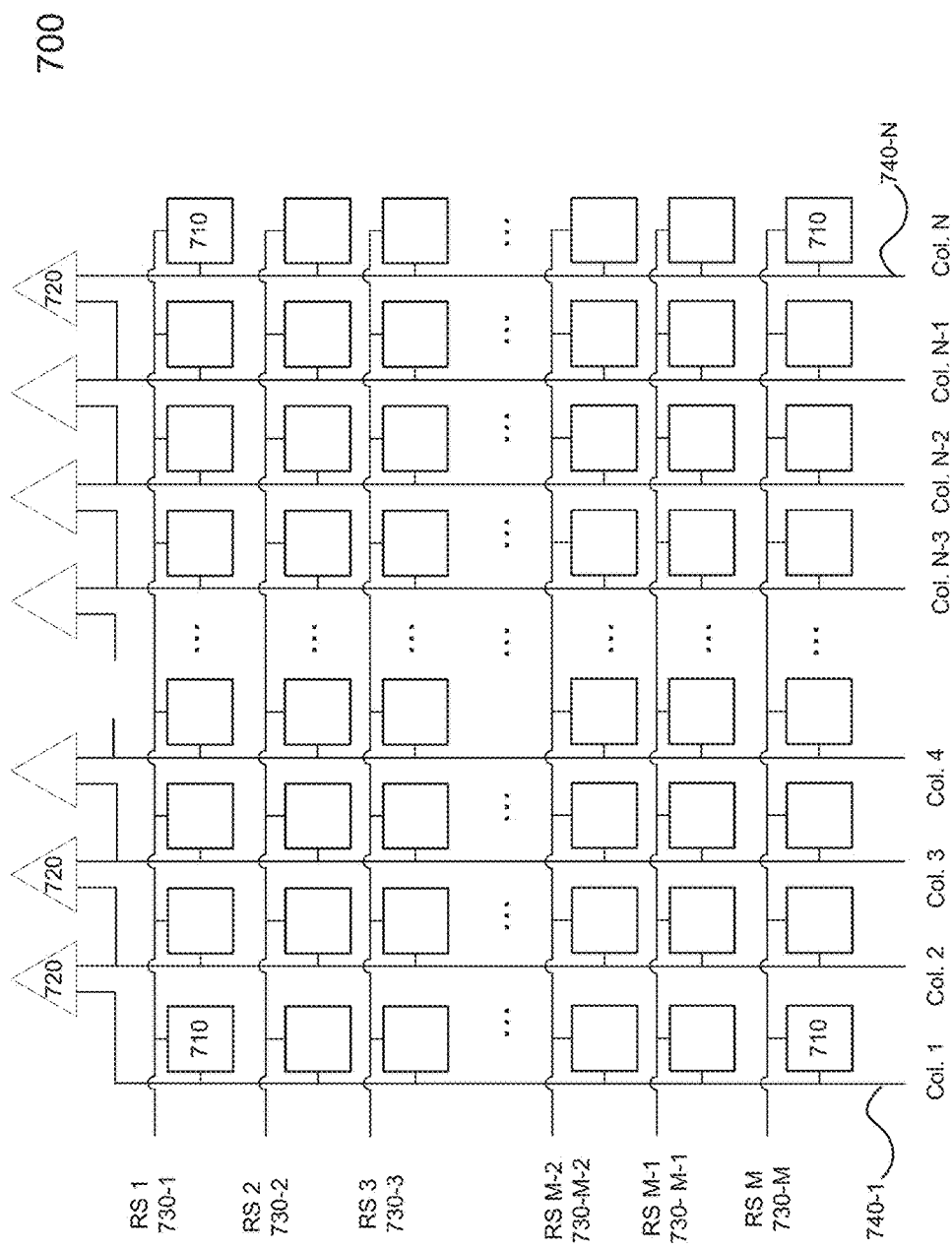
FIG. 7 illustrates an example inter-pixel mesh relationship sensor for motion detection, according to certain aspects of the present disclosure.

FIG. 7 illustrates an example inter-pixel mesh relationship sensor 700 for motion detection, according to certain aspects of the present disclosure. Inter-pixel mesh relationship sensor 700 includes N×M pixels 710 arranged in M rows and N columns. Each row of pixels 710 may be selectively activated using a row select (RS) signal RS 1 (730-1), RS 2 (730-2), . . . or RS M (730-M), and connected to the corresponding column lines 740-1, . . . , and 740-N. Analog detection signals from two adjacent pixels in the selected row that are connected to two adjacent column lines may be compared by a comparator 720 connected to the two adjacent column lines, and a single bit may be generated based on the relationship between the analog detection signals from the two adjacent pixels. For example, a "1" may be generated when the analog detection signal from a pixel on the left is greater than the analog detection signal from a pixel on the right. In this way, for a row with N pixels, N−1 1-bit values may be generated and saved to a memory. The M rows in the two-dimensional pixel array may be selected sequentially, and the detection signals from the pixels in each row may be connected to and compared by the comparator array to generate N−1 1-bit values indicating the inter-pixel mesh relationship between adjacent pixels in the row. As described above with respect to FIG. 6, one comparison image frame may be generated for the M×N pixels, where the comparison image frame may include M rows, and each row in the comparison image frame may include N−1 1-bit values. Thus, each comparison image frame may include M×(N−1) bits.

Figure 8:
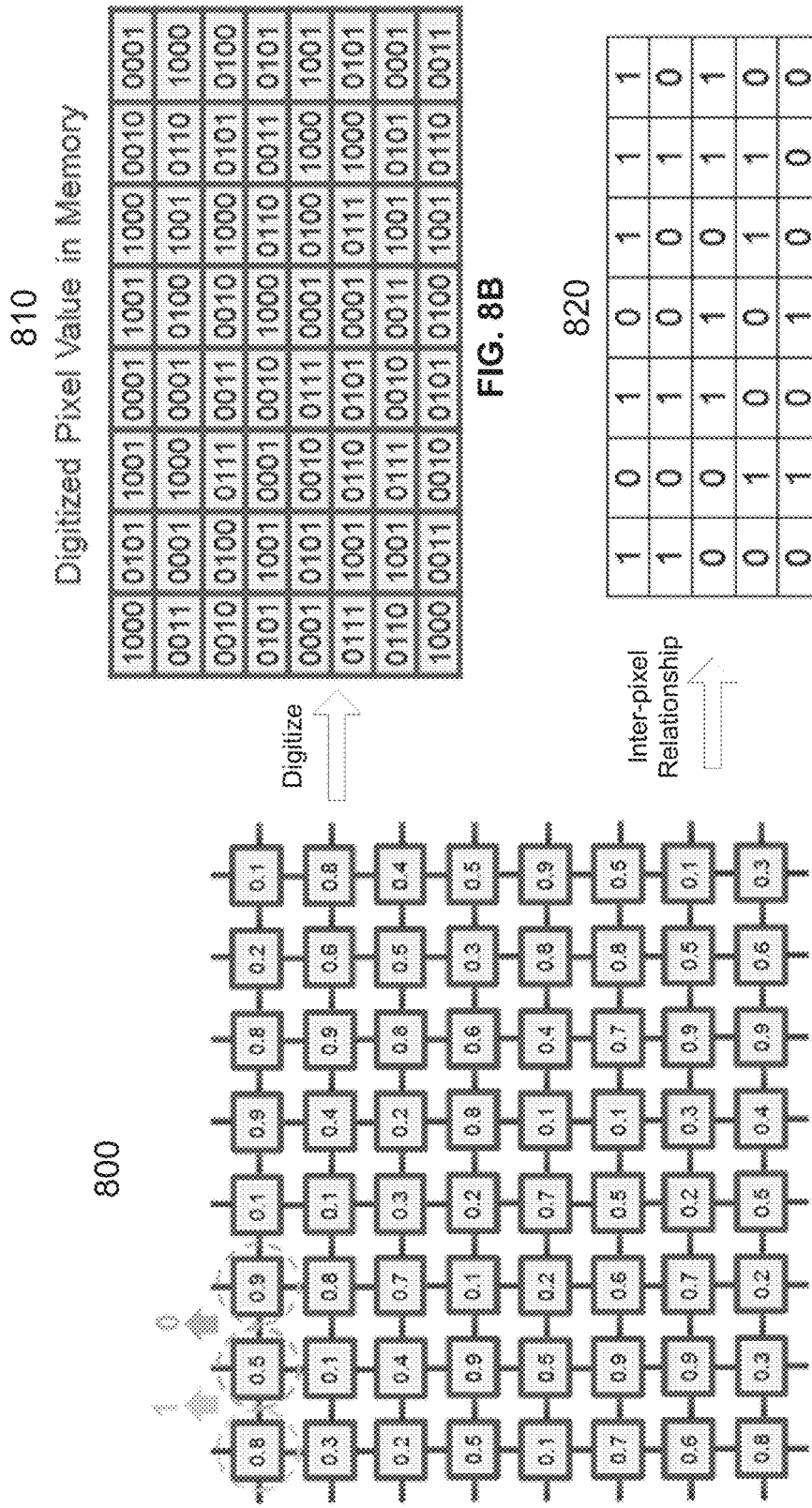
FIG. 8A illustrates an example sensor including an 8×8 pixel array with corresponding light intensity on each pixel.
FIG. 8B illustrates an example image frame including digitized pixel values corresponding to the light intensity values on the 8×8 pixel array of FIG. 8A.
FIG. 8C illustrates an example image frame including inter-pixel mesh relationship information corresponding to the light intensity values on the 8×8 pixel array of FIG. 8A.

FIG. 8A illustrates an example image sensor including an 8×8 pixel array 800 with integrated voltage or current corresponding to light intensity on each pixel. FIG. 8B illustrates an example image frame 810 including digitized pixel values corresponding to the light intensity values on the 8×8 pixel array of FIG. 8A. As shown in FIG. 8B, the analog detection signal from each pixel is digitized into a 4-bit value, and thus image frame 810 may include 8×8×4=256 bits.

FIG. 8C illustrates an example comparison image frame 820 including inter-pixel mesh relationship information corresponding to the light intensity values on the 8×8 pixel array of FIG. 8A. The light intensity values are not digitized using ADCs. Rather, as illustrated by FIGS. 8A and 8C, for a pair of adjacent pixels, or groups of pixels, when the light intensity value of the pixel on the left (e.g., 0.8) is greater than the light intensity value of the pixel on the right (e.g., 0.5), a "1" may be generated by a comparator. When the light intensity value of the pixel on the left (e.g., 0.5) is equal to or less than the light intensity value of the pixel on the right (e.g., 0.9), a "0" may be generated by the comparator. It is noted that, in different implementations, different criteria may be used to generate the inter-pixel mesh relationship. For example, in some implementations, when the light intensity value of the pixel on the left is greater than the light intensity value of the pixel on the right, a "0" may be generated by the comparator.

As shown by FIG. 8C, each comparison image frame 820 including inter-pixel mesh relationship information may include 8×7=56 bits. For the same image shown in FIG. 8A, comparison image frame 820 in FIG. 8C has a fewer number of bits and thus would occupy a much smaller memory space than image frame 810 in FIG. 8B. Furthermore, compared with digitized image frame 810 shown in FIG. 8B, no multi-bit analog-to-digital conversion is employed to generate comparison image frame 820 shown in FIG. 8C.

Although some of the above examples show inter-pixel mesh relationship between adjacent pixels on a row, in various embodiments, other configurations of the inter-pixel mesh relationship sensor may be used to generate the inter-pixel mesh relationship information. For example, in some implementations, pixels in a column may share one or more comparators. In some other implementations, each pixel may use a dedicated comparator. In some implementations, each comparator may be connected to two column lines that are not adjacent to each other and may compare the analog detection signals from two pixels that are not adjacent to each other. In some implementations, adjacent pixels in a column may be compared to generate the inter-pixel mesh relationship information. In some embodiments, two or more pixels may be grouped together, and an average or sum of the light intensity values from the pixels in the group may be compared with an average or sum of the light intensity values from the pixels in an adjacent group.

Figure 9:
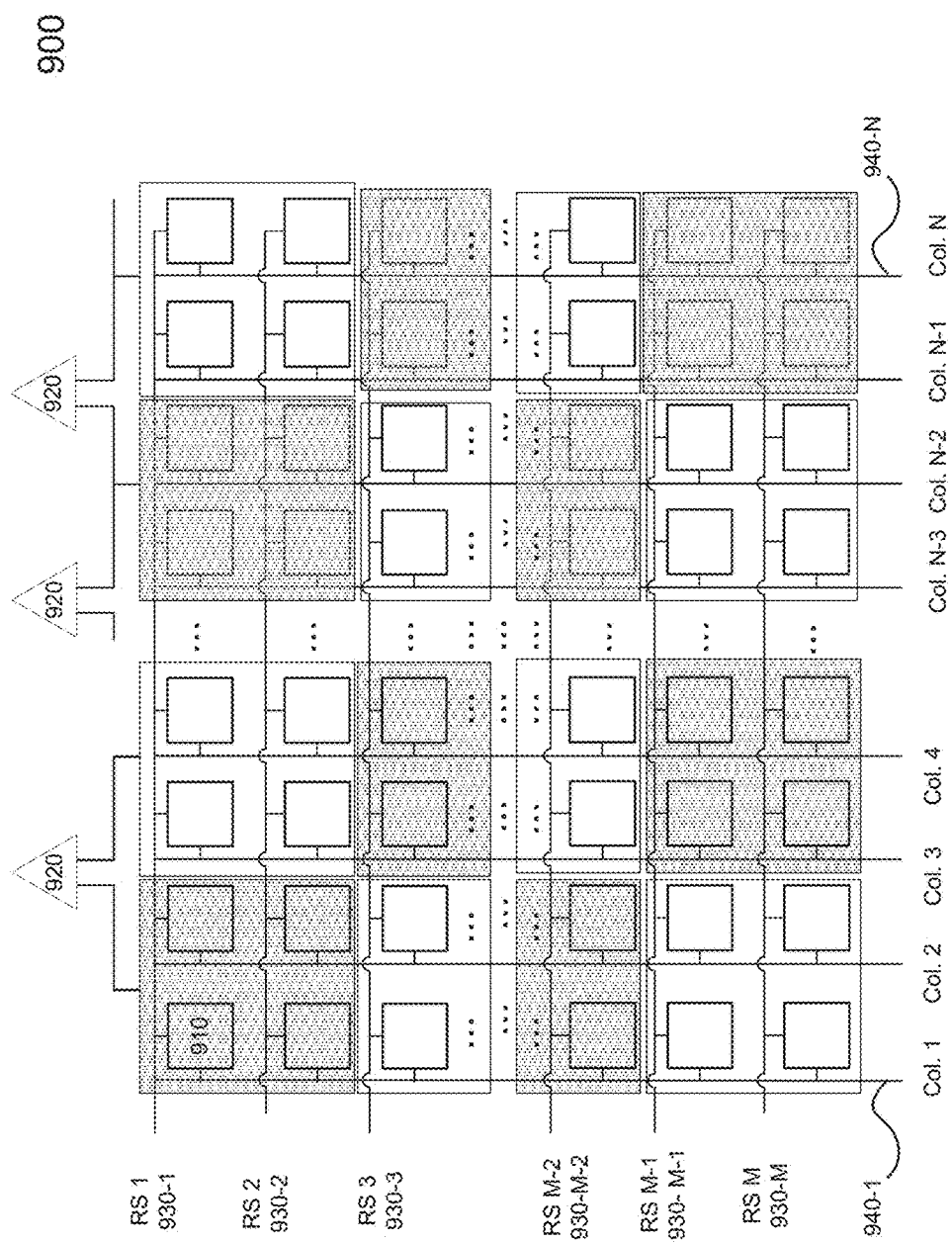
FIG. 9 illustrates another example inter-pixel mesh relationship sensor for motion detection, according to certain aspects of the present disclosure.

FIG. 9 illustrates an example inter-pixel mesh relationship sensor 900 for motion detection, according to certain aspects of the present disclosure. As inter-pixel mesh relationship sensor 700 of FIG. 7, inter-pixel mesh relationship sensor 900 may include N×M pixels 910 arranged in M rows and N columns. Each row of pixels 910 may be selectively activated using a row select (RS) signal RS 1 (930-1), RS 2 (930-2), . . . or RS M (930-M) and connected to the corresponding column lines 940-1, . . . , and 940-N. The N×M pixels 910 may be organized into a plurality of groups, each group including, for example, a 2×2 pixel array or sub-array. Analog detection signals from pixels in each group may, for example, be averaged or summed to generate a combined group signal for the group. The combined group signals for two adjacent groups may be compared by a comparator 920, and a single bit may be generated based on the relationship between the combined group signals for two adjacent groups, as described above. Thus, compared with the embodiment shown in FIG. 7, a smaller number of comparators 920 may be used in inter-pixel mesh relationship sensor 900; each comparison image frame generated by inter-pixel mesh relationship sensor 900 may include a fewer number of bits, but the resolution of the comparison image frame may be reduced while the angle of view remains the same. Inter-pixel mesh relationship sensor 700 may be one specific example of inter-pixel mesh relationship sensor 900 where both N and M are "1." In other words, in the example inter-pixel mesh relationship sensor 700 illustrated, each group of pixels includes one pixel (rather than a plurality of pixels), and thus the two groups of pixels may be two adjacent pixels in a row of pixels of the two-dimensional pixel array. Hence, in various implementations, a group of pixels can include a plurality of pixels or a group of pixels may consist of one pixel.

In some embodiments, instead of or in addition to grouping pixels, the N−1 1-bit values for each row from inter-pixel mesh relationship sensor 700 shown in FIG. 7 may be processed or compressed before being saved to the memory. Hence, the inter-pixel digital signals generated by the plurality of analog comparators for the plurality of groups of pixels may be processed and, subsequently, the processed inter-pixel digital signals can be stored in a memory device. For example, various encryption coding techniques, such as a secure key or a polynomial, may be applied to (e.g., multiplied with) one or more portions of the N−1 bits or all of the N−1 bits. In one example, a sum of all N−1 bits for the N pixels in a row may be used to represent the row. In another example, the N−1 bits may be divided into K sections, and each of the K sections may be processed or compressed before being saved to the memory. In this way, the memory space used and the complexity of the subsequent digital processing of two or more comparison image frames for motion detection may be further reduced.

IV. AER Image Sensor with Inter-Pixel Mesh Relationship Sensor

In some embodiments, a CMOS image sensor may be used both for motion detection with low power consumption and for capturing image at a high resolution when a motion is detected. For example, the image sensor may be configured to work at a motion detection mode, during which the image sensor may function as an inter-pixel mesh relationship sensor as described above. When a motion is detected and/or a high resolution image is desired, the image sensor may be configured to work at an image capturing mode for capturing images at a high resolution and/or high frame rate. In some applications, the CMOS image sensor may work in the motion detection mode and image capturing mode concurrently, at a cost of higher power consumption.

Figure 10:
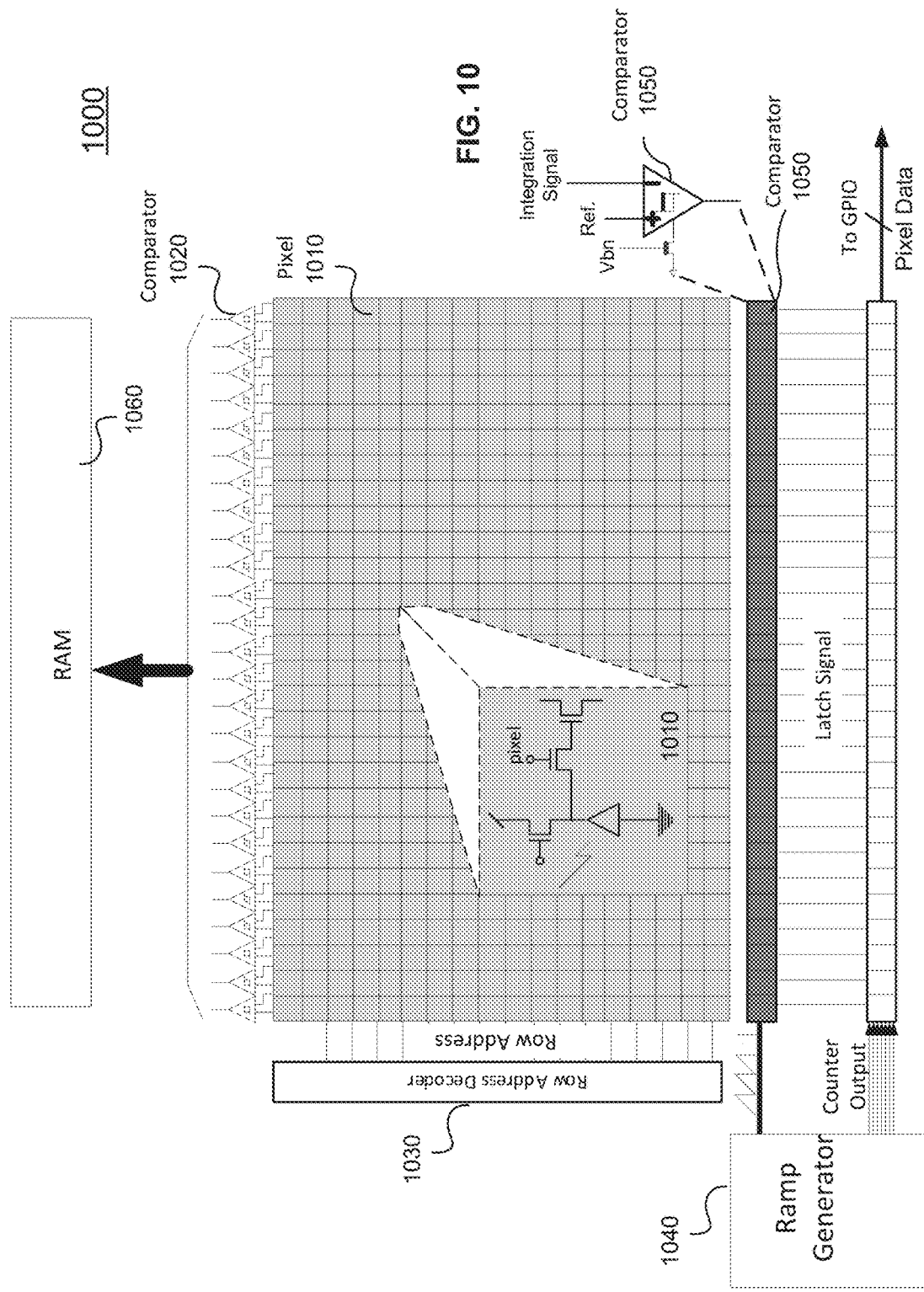
FIG. 10 illustrates an example image sensor including an inter-pixel mesh relationship sensor, according to certain aspects of the present disclosure.

FIG. 10 illustrates an example image sensor 1000 including an inter-pixel mesh relationship sensor, according to certain aspects of the present disclosure. As shown in FIG. 10, image sensor 1000 may include a two-dimensional array of pixels 1010, an array of comparators 1020 for inter-pixel mesh relationship generation, and a row address decoder 1030 for selecting a row of pixels from the plurality of rows in the two-dimensional array of pixels 1010, as described above with respect to FIG. 6. Image sensor 1000 may be used to generate comparison image frames that include the inter-pixel mesh relationship information, as described above with respect to, for example, FIG. 6. The comparison image frames that include the inter-pixel mesh relationship may be saved in a RAM 1060 for motion detection. For example, two consecutive comparison image frames may be compared to detect changes in the inter-pixel mesh relationship, which may indicate the motions of objects in the scene of the comparison image frames.

Image sensor 1000 may be an AER-based image sensor as described above with respect to FIG. 5, and may include a ramp generator 1040. When a motion is detected, image sensor 1000 may be configured to capture images with a higher gray-level/color resolution as described above with respect to FIG. 5. For example, the photodiode of a pixel may collect photons and generate an integration signal, for example, a voltage signal. An event may be generated, for example, using a comparator 1050 (e.g., a correlated double sampling (CDS) comparator), when the integration signal of an individual pixel sent to the comparator from a column line reaches a threshold voltage (e.g., set by ramp generator 1040), and the address of the pixel that generates the event may be latched onto a general-purpose input/output (GPIO) bus and transmitted to another circuit for generating the gray-scale image based on, for example, events generated at different threshold levels set by ramp generator 1040 as described above with respect to FIGS. 4 and 5.

In this way, image sensor 1000 may be used both as a low-power sensor for detecting motions, and as an image sensor for capturing high resolution images when a motion is detected.

V. Example Method

An inter-pixel mesh relationship sensor as described above may be used for motion detection and/or image capturing. For example, an inter-pixel mesh relationship sensor (e.g., 600, 700, or 900) may be used to generate comparison image frames indicating inter-pixel mesh relationship, and changes in the inter-pixel mesh relationship between consecutive comparison image frames may be used to detect a motion of an object. In some implementations, an image sensor, such as image sensor 1000, may be configured to work in either a first mode for motion detection or a second mode for image capturing when a motion of an object is detected.

Figure 11:
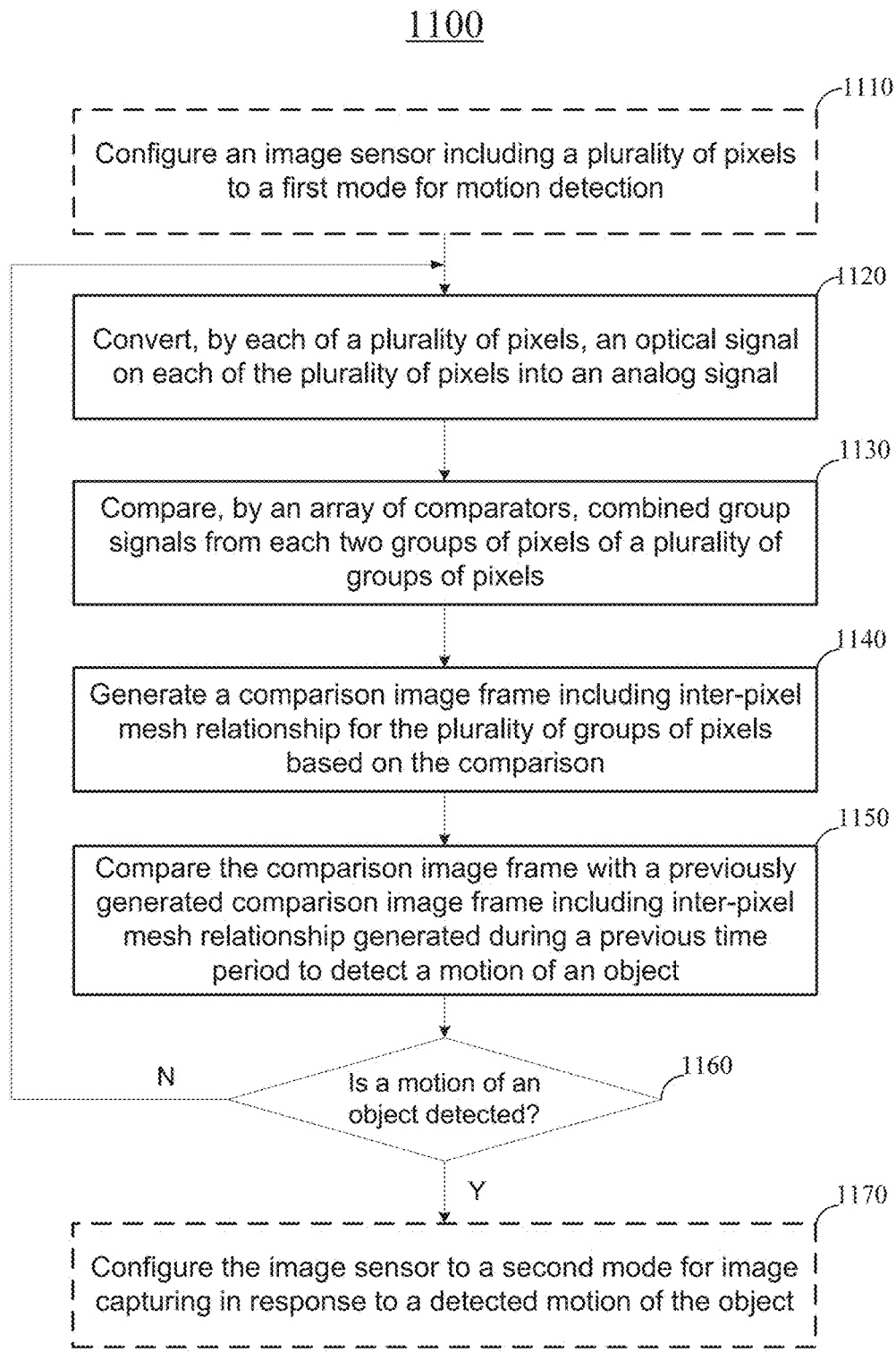
FIG. 11 is a flow chart illustrating an example method of motion detection using an image sensor, according to certain aspects of the present disclosure.

FIG. 11 is a flow chart 1100 illustrating an example method of motion detection using an image sensor, such as inter-pixel mesh relationship sensor 600, 700, or 900, or image sensor 1000, according to certain aspects of the present disclosure. It is noted that even though FIG. 11 describes the operations as a sequential process, some of the operations can be performed in parallel or concurrently. In addition, the order of the operations may be rearranged. An operation may have additional steps not included in the figure. Some operations may be optional, and thus may be omitted in various embodiments. Some operations described at one block may be performed together with operations at another block. Furthermore, embodiments of the methods may be implemented in hardware, software, firmware, middleware, microcode, hardware description languages, or any combination thereof.

At block 1110, when an image sensor including an inter-pixel mesh relationship sensor, such as image sensor 1000, is used, the image sensor may be configured to work in a first mode for motion detection. The image sensor may include a plurality of pixels. In the first mode, some or all pixels of the image sensor may be activated for motion detection. For example, in some implementations, a portion, such as a center portion of pixels in the image sensor, may be activated, and an optical system may be zoomed to form an optical image on the center portion of the image sensor. In the first mode, a comparator array (e.g., the array of comparators 1020 of FIG. 10) and a row address decoder (e.g., row address decoder 1030) may also be activated, while other circuits of the image sensor may be deactivated. Thus, the image sensor may consume little power during the first mode.

Operations at blocks 1120-1160 may be performed for each comparison image frame and may be performed repeatedly until a motion of an object in the field of view of the image sensor is detected. At block 1120, each of the plurality of pixels may convert an optical signal incident on each of the plurality of pixels into an electrical analog signal as described above. The plurality of pixels may form a 2-dimensional pixel array. For example, each pixel in the array may include an optical sensor (e.g., a photodetector) for converting an optical signal to a voltage or current signal. The optical sensor may be an active CMOS optical sensor. Each pixel may also include an integrator for integrating the converted voltage or current signal. Means for performing the operations at block 1120 may include, but are not limited to, for example, the two-dimensions pixel array shown in FIG. 6, 7, 9, or 10. In some implementations, the pixels in the two-dimensional pixel array may be arranged into a plurality of groups of pixels, and a combined group signal for each group of pixels may be generated, for example, by averaging or summing the analog detection signals from the individual pixels in each group of pixels, or otherwise generating a combined group signal representing a combining or aggregation of the individual signals of individual pixels within each group of pixels. Hence, in this example, each group of pixels is associated with the combined group signal which is determined based on the analog signal from pixels in the group of pixels.

At block 1130, an array of comparators may be used to compare combined group signals from each two groups of pixels of a plurality of groups of pixels to generate inter-pixel mesh relationship among the plurality of groups of pixels. For example, in some embodiments, one row of pixels in the image sensor may be selected at a time, and analog detection signals from each pair of adjacent pixels in the row of pixels may be compared by a comparator in the array of comparators to determine the inter-pixel mesh relationship among pixels in the row, as described above with respect to, for example, FIGS. 6-8. All rows in the activated portion of the image sensor may be selected one at a time to determine the inter-pixel mesh relationship among pixels in the row. In some embodiments, as described above with respect to FIG. 9, analog detection signals from a group of pixels may be averaged or summed to generate the combined group signal, and the combined group signal may be compared with a combined group signal of an adjacent group of pixels to determine the inter-pixel mesh relationship among groups of pixels. Means for performing the operations at block 1130 may include, but are not limited to, for example, the two-dimensions pixel array and comparator array shown in FIG. 6, 7, 9, or 10.

At block 1140, a comparison image frame including inter-pixel mesh relationship information may be generated for the plurality of groups of pixels based on the comparison. For example, the inter-pixel mesh relationship among pixels in each row of the plurality of rows may be saved in a row of a comparison image frame, as shown in, for example, FIG. 8C. Means for performing the operations at block 1140 may include, but are not limited to, for example, the two-dimensions pixel array and comparator array shown in FIG. 6, 7, 9, or 10, and a storage device, such as RAM 1060.

At block 1150, the generated comparison image frame may be compared with a previously generated comparison image frame including inter-pixel digital signals for the plurality of groups of pixels (e.g., inter-pixel mesh relationship information) generated during a previous time period to detect a motion of an object. For example, a subtraction between the two comparison image frames as described above may be performed. The previous comparison image frame may be generated as described above in blocks 1120-1140. The rate that the comparison image frames are generated may be, for example, 30 frames-per-second (fps), 15 fps, 10 fps, 5 fps, 1 fps, or less. For example, with a frame rate of 30 fps, the previous comparison image frame may be generated at $\frac{1}{30}$ second before the current comparison image frame. Means for performing the operations at block 1150 may include, but are not limited to, for example, image processor 140 of FIG. 1, or processor (s) 1210 as described below with respect to FIG. 12. In some embodiments, means for performing the operations at block 1150 may include a software executable on a processor, such as processor(s) 1210, or a firmware.

At block 1160, it may be determined whether a motion of an object is detected based on the comparison results at block 1150. If the changes in the inter-pixel mesh relationship between two consecutive comparison image frames indicate that a motion of an object is detected, the flow may proceed to block 1170. Otherwise, the flow may go back to block 1120, and the operations at blocks 1120-1160 may be performed iteratively until a motion of an object in the field of view of the image sensor is detected.

Optionally, at block 1170, in response to a detected motion of the object, the image sensor, such as image sensor 1000, may be set to a second mode for image capturing, as described above with respect to FIG. 10. For example, image sensor 1000 may be set to a full-solution mode, and circuits such as ramp generator 1040 and other AER-related circuits may be activated. In some embodiments, the optical system may be adjusted, and only the image of the region where the motion is detected may be captured in order to acquire more details of the object in motion. Means for performing the operations at block 1170 may include, but are not limited to, for example, image sensor 1000 of FIG. 10.

In some implementations, a computing device (e.g., a special purpose computing device, a process, or a circuit) may execute instructions stored on a non-transitory storage medium to receive 1-bit inter-pixel digital signals for a plurality of groups of pixels of a two-dimensional pixel array, and generate a comparison image frame including the inter-pixel digital signals for the plurality of groups of pixels. The 1-bit inter-pixel digital signals may be generated as output by each analog comparator of a plurality of analog comparators taking combined group signals from a pair of adjacent groups of pixels in the plurality of groups of pixels of the two-dimensional pixel array as input, as described above with respect to, for example, FIGS. 8A-8C, 9, and 10. In some embodiments, the instructions may be executable by the special purpose computing device to receive inter-pixel digital signals for groups of pixels in each row of pixels from the two-dimensional pixel array, and store the inter-pixel digital signals for the groups of pixels in each row of pixels as a row in the comparison image frame, where the comparison image frame may include a plurality of rows each corresponding to a row of pixels of the two-dimensional pixel array.

In some embodiments, the instructions may be executable by the special purpose computing device to process the inter-pixel digital signals generated by the plurality of analog comparators for the plurality of groups of pixels, and then store the processed inter-pixel digital signals in a memory device. Processing the inter-pixel digital signals may include, for example, encoding or compressing the inter-pixel digital signals generated by the plurality of analog comparators for the plurality of groups of pixels.

In some embodiments, the special purpose computing device may execute instructions to compare the comparison image frame with a previous comparison image frame including inter-pixel digital signals for the plurality of groups of pixels generated during a previous time period to detect a motion of an object. For example, a subtraction between the two comparison image frames as described above may be performed. The previous comparison image frame may be generated in a similar manner as described above.

In some embodiments, the special purpose computing device may determine whether a motion of an object is detected based on the comparison results. If the changes in the inter-pixel mesh relationship between two consecutive comparison image frames indicate that a motion of an object is detected, the special purpose computing device may set the two-dimensional pixel array to a mode for image capturing as described above with respect to, for example, FIGS. 10 and 11.

VI. System Example

According to one or more aspects, any and/or all of the apparatus modules, circuitry, methods and/or method steps described in FIGS. 1-11 herein may be implemented by and/or in an electrical circuit or a computing device. Additionally or alternatively, any and/or all of the methods and/or method steps described herein may be implemented in computer-readable instructions, such as computer-readable instructions stored on a computer-readable medium, such as memory, storage or another computer-readable medium.

Figure 12:
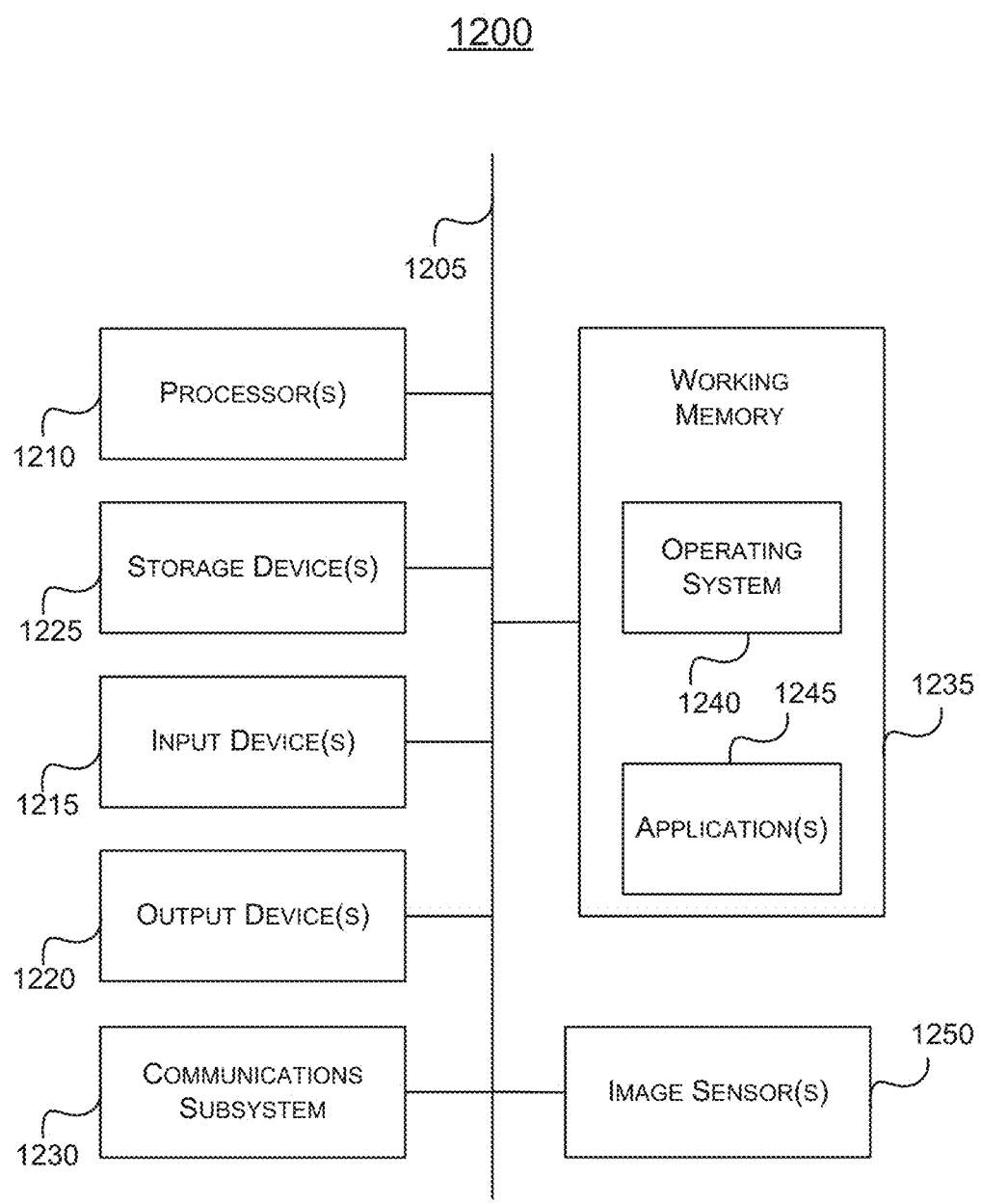
FIG. 12 illustrates an example of a computing system in which one or more embodiments may be implemented.

FIG. 12 illustrates an example computing device 1200 incorporating at least parts of the device or system employed in practicing embodiments of the disclosure. For example, computing device 1200 may represent some of the components of a mobile device or any other computing device. Examples of computing device 1200 include, but are not limited to, desktops, workstations, personal computers, supercomputers, video game consoles, tablets, smart phones, laptops, netbooks, or other portable devices. FIG. 12 provides a schematic illustration of one embodiment of computing device 1200 that may perform the methods provided by various other embodiments, as described herein, and/or may function as the host computing device, a remote kiosk/terminal, a point-of-sale device, a mobile multifunction device, a set-top box and/or a computing device. FIG. 12 is meant only to provide a generalized illustration of various components, any or all of which may be utilized as appropriate. FIG. 12, therefore, broadly illustrates how individual system elements may be implemented in a relatively separated or relatively more integrated manner.

Computing device 1200 is shown comprising hardware elements that may be electrically coupled via a bus 1205 (or may otherwise be in communication, as appropriate). The hardware elements may include one or more processors 1210, including, without limitation, one or more general-purpose processors and/or one or more special-purpose processors (such as digital signal processing chips, graphics acceleration processors, and/or the like); one or more input devices 1215, which may include, without limitation, one or more sensors 1250, a touch screen, a mouse, a keyboard and/or the like; and one or more output devices 1220, which may include, without limitation, a display unit, a printer and/or the like. Sensors 1250 may include image/vision sensors, olfactory sensors and/or chemical sensors.

Computing device 1200 may further include (and/or be in communication with) one or more non-transitory storage devices 1225, which may comprise, without limitation, local and/or network accessible storage, and/or may include, without limitation, a disk drive, a drive array, an optical storage device, a solid-form storage device such as a RAM and/or a read-only memory (ROM), which may be programmable, flash-updateable and/or the like. Such storage devices may be configured to implement any appropriate data storage, including, without limitation, various file systems, database structures, and/or the like.

Computing device 1200 may also include a communications subsystem 1230. Communications subsystem 1230 may include a transceiver for receiving and transmitting data or a wired and/or wireless medium. Communications subsystem 1230 may also include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. Communications subsystem 1230 may permit data to be exchanged with a network, other computing devices, and/or any other devices described herein. In many embodiments, computing device 1200 may further comprise a non-transitory working memory 1235, which may include a RAM or ROM device, as described above.

Computing device 1200 may comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer), such as the example method illustrated in FIG. 11; in an aspect, then, such code and/or instructions may be used to configure and/or adapt a general purpose computer (or other device) to perform one or more operations in accordance with the described methods.

A set of these instructions and/or code might be stored on a computer-readable storage medium, such as storage device(s) 1225 described above. In some cases, the storage medium might be incorporated within a computing device, such as computing device 1200. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by computing device 1200 and/or might take the form of source and/or installable code, which, upon compilation and/or installation on computing device 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1200 such as network input/output devices may be employed.

Some embodiments may employ a computing device (such as computing device 1200) to perform methods in accordance with the disclosure. For example, some or all of the procedures of the described methods may be performed by computing device 1200 in response to processor 1210 executing one or more sequences of one or more instructions (which might be incorporated into operating system 1240 and/or other code, such as an application program 1245) contained in working memory 1235. Such instructions may be read into working memory 1235 from another computer-readable medium, such as one or more of storage device(s) 1225. Merely by way of example, execution of the sequences of instructions contained in working memory 1235 might cause processor(s) 1210 to perform one or more procedures of the methods described herein.

The terms "machine-readable medium" and "computer-readable medium," as used herein, refer to any medium that participates in providing data that causes a machine to operate in a specific fashion. In an embodiment implemented using computing device 1200, various computer-readable media might be involved in providing instructions/code to processor(s) 1210 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as storage device(s) 1225. Volatile media include, without limitation, dynamic memory, such as working memory 1235. Transmission media include, without limitation, coaxial cables, copper wire and fiber optics, including the wires comprising the bus 1205, as well as the various components of communications subsystem 1230 (and/or the media by which communications subsystem 1230 provides communication with other devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in the analog domain.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1200. These signals, which might be in the form of electromagnetic signals, acoustic signals, optical signals and/or the like, are all examples of carrier waves on which instructions may be encoded, in accordance with various embodiments of the invention.

Communications subsystem 1230 (and/or components thereof) generally will receive the signals, and bus 1205 then might carry the signals (and/or the data, instructions, etc., carried by the signals) to working memory 1235, from which processor(s) 1210 retrieves and executes the instructions. The instructions received by working memory 1235 may optionally be stored on a non-transitory storage device 1225 either before or after execution by processor(s) 1210.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments described herein. Also, a number of steps may be undertaken before, during, or after the above elements are considered. Accordingly, the above description does not limit the scope of the disclosure.

What is claimed is:

1. An image sensor comprising:
 a two-dimensional pixel array characterized by a plurality of rows of pixels and a plurality of columns of pixels, wherein:
  each pixel is configured to convert an optical signal on the pixel into an analog signal; and
  the two-dimensional pixel array is organized into a plurality of groups of pixels, each group of pixels associated with a combined group signal determined based on the analog signals from pixels in the group of pixels; and
 a plurality of analog comparators, each analog comparator comprising two inputs and configured to compare combined group signals generated by two groups of pixels of the plurality of groups of pixels during a same time period to generate a 1-bit inter-pixel digital signal, each of the two groups of pixels coupled to a corresponding input of the two inputs of the each analog comparator.

2. The image sensor of claim 1, wherein the combined group signal generated by a group of pixels comprises a sum or an average of the analog signals generated by pixels in the group of pixels.

3. The image sensor of claim 1, further comprising a decoder circuit configured to selectively couple outputs of a number of groups of pixels to the plurality of analog comparators at a time.

4. The image sensor of claim 1, wherein each group of the two groups of pixels consists of one pixel, and the two pixels for the two groups of pixels are adjacent pixels in a row of pixels of the two-dimensional pixel array.

5. The image sensor of claim 4, further comprising a row decoder circuit configured to selectively couple outputs of one row of pixels from the plurality of rows of pixels to the plurality of analog comparators at a time.

6. The image sensor of claim 5, further comprising a circuit configured to store inter-pixel digital signals for groups of pixels in each row of pixels, the inter-pixel digital signals comprising a row in a comparison image frame, the comparison image frame comprising a plurality of rows each corresponding to a row of pixels of the two-dimensional pixel array.

7. The image sensor of claim 1, further comprising a circuit configured to:
process the inter-pixel digital signals generated by the plurality of analog comparators for the plurality of groups of pixels; and
store the processed inter-pixel digital signals in a memory device.

8. The image sensor of claim 7, wherein processing the inter-pixel digital signals comprises encoding the inter-pixel digital signals generated by the plurality of analog comparators for the plurality of groups of pixels.

9. The image sensor of claim 1, wherein each analog comparator of the plurality of analog comparators is configured to generate a "1" when a combined group signal connected to a positive input of the analog comparator is greater than a combined group signal connected to a negative input of the analog comparator, and generate a "0" otherwise.

10. The image sensor of claim 1, wherein each pixel in the two-dimensional pixel array comprises a comparator configured to generate an event signal when the analog signal is higher than a reference signal level.

11. The image sensor of claim 10, further comprising:
an address encoder configured to encode an address of a pixel that generates the event signal; and
a processing unit configured to generate an image frame based on the address of the pixel that generates the event signal.

12. The image sensor of claim 10, further comprising:
a global reference generator configured to generate a plurality of reference signal levels for the two-dimensional pixel array.

13. A method of motion detection, comprising:
converting, by each pixel of a plurality of pixels of a two-dimensional pixel array on an image sensor, an optical signal on the pixel into an analog signal, wherein the two-dimensional pixel array is organized into a plurality of groups of pixels, and wherein each group of pixels is associated with a combined group signal determined based on the analog signals from the group of pixels;
comparing, by each analog comparator of a plurality of analog comparators, combined group signals from a pair of adjacent groups of pixels in the plurality of groups of pixels to generate a 1-bit inter-pixel digital signal, wherein the combined group signals from the pair of adjacent groups of pixels are generated during a same time period; and
generating a comparison image frame including inter-pixel digital signals for the plurality of groups of pixels.

14. The method of claim 13, further comprising:
comparing the comparison image frame with a previous comparison image frame including inter-pixel digital signals for the plurality of groups of pixels generated during a previous time period to detect a motion of an object.

15. The method of claim 14, further comprising:
in response to a detected motion of the object, configuring the image sensor to capture images using the two-dimensional pixel array.

16. The method of claim 15, wherein capturing images using the two-dimensional pixel array comprises:
generating an event signal when the analog signal from a pixel of the plurality of pixels is higher than a reference signal level;
encoding an address of the pixel that causes the generation of the event signal; and
generating an image frame based on the address of the pixel that generates the event signal.

17. The method of claim 13, wherein each group of the pair of adjacent groups of pixels consists of one pixel, and the two pixels for the pair of adjacent groups of pixels are adjacent pixels in a row of pixels of the two-dimensional pixel array.

18. The method of claim 17, further comprising:
selectively coupling outputs of one row of pixels from the two-dimensional pixel array to the plurality of analog comparators at a time.

19. The method of claim 18, further comprising:
storing inter-pixel digital signals for groups of pixels in each row of pixels, the inter-pixel digital signals comprising a row in the comparison image frame, the comparison image frame comprising a plurality of rows each corresponding to a row of pixels of the two-dimensional pixel array.

20. The method of claim 13, further comprising:
processing the inter-pixel digital signals generated by the plurality of analog comparators for the plurality of groups of pixels; and
storing the processed inter-pixel digital signals in a memory device.

21. The method of claim 20, wherein processing the inter-pixel digital signals comprises encoding the inter-pixel digital signals generated by the plurality of analog comparators for the plurality of groups of pixels.

22. The method of claim 13, wherein each analog comparator of the plurality of analog comparators is configured to generate a "1" when a combined group signal connected to a positive input of the analog comparator is greater than a combined group signal connected to a negative input of the analog comparator, and generate a "0" otherwise.

23. An apparatus for motion detection, comprising:
a plurality of means for converting an optical signal into an analog signal, wherein the plurality of means for converting the optical signal into the analog signal is organized into a plurality of groups, each group is associated with a combined group signal determined based on the analog signals from the means for converting the optical signal into the analog signal in the group;
means for comparing combined group signals from adjacent groups of the plurality of groups to generate 1-bit inter-pixel digital signals for the plurality of groups, wherein the combined group signals from a pair of adjacent groups are generated during a same time period; and means for generating a comparison image frame including the 1-bit inter-pixel digital signals for the plurality of groups.

24. The apparatus of claim 23, further comprising:
means for comparing the comparison image frame with a previous comparison image frame including inter-pixel digital signals for the plurality of groups generated during a previous time period to detect a motion of an object.

25. The apparatus of claim 23, further comprising:
means for processing the inter-pixel digital signals; and
means for storing the processed inter-pixel digital signals.

26. The apparatus of claim 25, wherein:
the means for processing the inter-pixel digital signals comprises means for encoding the inter-pixel digital signals.

27. An article comprising a non-transitory storage medium including machine-readable instructions stored thereon that are executable by a special purpose computing device to:
receive 1-bit inter-pixel digital signals, wherein the 1-bit inter-pixel digital signals are generated as output by each analog comparator of a plurality of analog comparators taking combined group signals from a pair of adjacent groups of pixels in a plurality of groups of pixels of a two-dimensional pixel array as input, wherein the combined group signals from the pair of adjacent groups of pixels are generated during a same time period; and generate a comparison image frame including the inter-pixel digital signals for the plurality of groups of pixels.

28. The article of claim 27, wherein the non-transitory storage medium further includes machine-readable instructions stored thereon that are executable by the special purpose computing device to:
compare the comparison image frame with a previous comparison image frame including inter-pixel digital signals for the plurality of groups of pixels generated during a previous time period to detect a motion of an object.

29. The article of claim 27, wherein the non-transitory storage medium further includes machine-readable instructions stored thereon that are executable by the special purpose computing device to:
receive inter-pixel digital signals for groups of pixels in each row of pixels of the two-dimensional pixel array; and
store the inter-pixel digital signals for the groups of pixels in each row of pixels as a row in the comparison image frame, the comparison image frame comprising a plurality of rows each corresponding to a row of pixels of the two-dimensional pixel array.

30. The article of claim 27, wherein the non-transitory storage medium further includes machine-readable instructions stored thereon that are executable by the special purpose computing device to:
process the inter-pixel digital signals generated by the plurality of analog comparators for the plurality of groups of pixels; and
store the processed inter-pixel digital signals in a memory device.

* * * * *